US009244934B2

(12) United States Patent
Besen et al.

(10) Patent No.: US 9,244,934 B2
(45) Date of Patent: Jan. 26, 2016

(54) SHARING AND SYNCHRONIZING ELECTRONICALLY STORED FILES

(75) Inventors: Adam Besen, Lyons, CO (US); Hwi Cheong, Brooklyn, NY (US); Alexander DeNeui, Kirkland, WA (US); Frank Pape, Cortlandt Manor, NY (US); Himanshu Vasishth, Bellevue, WA (US)

(73) Assignee: Google Inc., Mountain View, CA (US)

( * ) Notice: Subject to any disclaimer, the term of this patent is extended or adjusted under 35 U.S.C. 154(b) by 493 days.

(21) Appl. No.: 13/453,748

(22) Filed: Apr. 23, 2012

(65) Prior Publication Data

US 2013/0282785 A1    Oct. 24, 2013

(51) Int. Cl.
*G06F 17/30* (2006.01)

(52) U.S. Cl.
CPC .... *G06F 17/30144* (2013.01); *G06F 17/30174* (2013.01); *G06F 17/30215* (2013.01)

(58) Field of Classification Search
CPC .................................................. G06F 17/30174
USPC ............... 709/201, 205, 224; 707/625, 802, 707/609–615, 617, 618, 620, 624; 790/799
See application file for complete search history.

(56) References Cited

U.S. PATENT DOCUMENTS

| | | | |
|---|---|---|---|
| 6,324,544 B1 | 11/2001 | Alam et al. | |
| 6,430,576 B1 | 8/2002 | Gates et al. | |
| 6,438,563 B1 | 8/2002 | Kawagoe | |
| 6,526,434 B1 | 2/2003 | Carlson et al. | |
| 6,757,696 B2 | 6/2004 | Multer et al. | |
| 6,842,768 B1 | 1/2005 | Shaffer et al. | |
| 6,993,522 B2 | 1/2006 | Chen et al. | |
| 7,024,429 B2 | 4/2006 | Ngo et al. | |
| 7,024,430 B1 | 4/2006 | Ingraham et al. | |
| 7,124,151 B1 | 10/2006 | Choi | |
| 7,155,465 B2 | 12/2006 | Lee et al. | |
| 7,203,708 B2 | 4/2007 | Liu et al. | |
| 7,240,091 B1 * | 7/2007 | Hopmann | G06F 17/30578 707/999.201 |
| 7,293,049 B2 | 11/2007 | Kadyk et al. | |
| 7,315,978 B2 | 1/2008 | Giles | |
| 7,529,780 B1 | 5/2009 | Braginsky et al. | |
| 8,447,820 B1 | 5/2013 | Gay | |
| 2002/0029273 A1 | 3/2002 | Haroldson et al. | |
| 2002/0069192 A1 | 6/2002 | Aegerter | |
| 2002/0165724 A1 | 11/2002 | Blankesteijn | |
| 2004/0122870 A1 | 6/2004 | Park et al. | |
| 2004/0243644 A1 | 12/2004 | Steere et al. | |
| 2005/0177617 A1 | 8/2005 | Banginwar et al. | |
| 2005/0203962 A1 | 9/2005 | Zhou et al. | |

(Continued)

OTHER PUBLICATIONS

Non-Final Office Action dated Nov. 7, 2013 for U.S. Appl. No.13/453,678.

(Continued)

*Primary Examiner* — Sheree Brown
(74) *Attorney, Agent, or Firm* — Ropes & Gray LLP

(57) ABSTRACT

Aspects of the present disclosure are directed to architectures, methods and systems and structures that facilitate the sharing and synchronization of electronically stored files among and between cloud entities and a number of computers, systems, devices and/or users. One particular exemplary architectural aspect includes the serial processing and ordering of work items associated with file system changes such that correct parallel execution of the work items may proceed resulting in the synchronization of the cloud file system and the client computer file system.

16 Claims, 22 Drawing Sheets

(56) References Cited

U.S. PATENT DOCUMENTS

| | | | |
|---|---|---|---|
| 2005/0216524 A1 | 9/2005 | Gomes et al. | |
| 2005/0230914 A1 | 10/2005 | Campbell | |
| 2005/0256907 A1 | 11/2005 | Novik et al. | |
| 2005/0259606 A1 | 11/2005 | Shutter et al. | |
| 2006/0015539 A1 | 1/2006 | Wolf et al. | |
| 2006/0031264 A1 | 2/2006 | Bosworth et al. | |
| 2006/0041596 A1 | 2/2006 | Stirbu et al. | |
| 2006/0074666 A1 | 4/2006 | Chung | |
| 2006/0106879 A1 | 5/2006 | Zondervan et al. | |
| 2006/0136511 A1 | 6/2006 | Ngo et al. | |
| 2006/0248530 A1* | 11/2006 | Ahmad et al. | 718/102 |
| 2008/0219423 A1 | 9/2008 | Lyman | |
| 2009/0217197 A1 | 8/2009 | Shindo | |
| 2009/0300169 A1* | 12/2009 | Sagar | H04L 12/24 709/224 |
| 2010/0082534 A1* | 4/2010 | Sagar et al. | 707/610 |
| 2010/0161759 A1* | 6/2010 | Brand | H04L 67/1097 709/218 |
| 2010/0257251 A1* | 10/2010 | Mooring | H04W 4/206 709/216 |
| 2010/0287219 A1 | 11/2010 | Caso et al. | |
| 2010/0287319 A1 | 11/2010 | Hill et al. | |
| 2011/0078243 A1* | 3/2011 | Carpenter | G06F 17/246 709/204 |
| 2011/0113031 A1 | 5/2011 | Oliver et al. | |
| 2011/0231386 A1 | 9/2011 | Wang et al. | |
| 2011/0246753 A1 | 10/2011 | Thomas | |
| 2011/0251992 A1* | 10/2011 | Bethlehem | H04L 12/2863 707/610 |
| 2012/0005193 A1* | 1/2012 | Nemoto | G06F 9/5072 707/722 |
| 2012/0005256 A1 | 1/2012 | Cherukuri et al. | |
| 2012/0030018 A1 | 2/2012 | Passmore et al. | |
| 2012/0189186 A1 | 7/2012 | Csulits et al. | |
| 2012/0239621 A1 | 9/2012 | Savenok et al. | |
| 2013/0110905 A1* | 5/2013 | Howe | H04L 67/42 709/203 |
| 2013/0282657 A1 | 10/2013 | Besen et al. | |
| 2013/0282658 A1 | 10/2013 | Besen et al. | |
| 2013/0282790 A1 | 10/2013 | Catmull et al. | |
| 2013/0282830 A1 | 10/2013 | Besen et al. | |

OTHER PUBLICATIONS

Final Office Action dated Nov. 1, 2013 for U.S. Appl. No. 13/453,799.
Non-Final Office Action dated Nov. 27, 2013 for U.S. Appl. No. 13/453,860.
Busch, Jack, CloudHQ Review: Synchronize Google Docs, Dropbox, SugarSync and Basecamp Files, GroovyPost[online], [Retrieved on Aug. 6, 2012], Retrieved from the internet: ,URL: http://www.groovypost.com/howto/reviews/cloudhq=-review-synch-google-docs-dropbox-sugarsync-basecamp/.
CLOUDHQ, Backup Google docs to Dropbox—Continuously and in Real-Time: URL:https://www.cloudhq.net/dropbox/backup-google-docs; 2001-2012 by cloudHQ (Retrieve from the internet Nov. 7, 2012).
Final Office Action dated Jan. 2, 2013 for U.S. Appl. No. 13/453,909.
Google Docs, Wikipedia [online], Retrieved on Aug. 6, 2012], Retrieved from the internet: ,URL: http://en.wikipedia.org/wiki/Google_Docs.
Make Use of: The Unofficial Guide to Dropbox by Matt Smith http://www.smidgenpc.com; http://www.makeuseof.com/pages/download-using-the-magic-pocket-a-dropbox-guide. Retrieved Apr. 12, 2013. Published Nov. 2010.
Mendelson, E., et al., Sugar Sync, PCWorld Magazine [online], [Retrieved on Aug. 3, 2012], Retrieved from the internet: <URL: http://www.pcmag.com/article2/0,2817,2343599,00.asp.
Microsoft Windows, Skydrive, Any file, anywhere: URL:/https://www.windows.microsoft.com/en-US/skydrive; 2012 Microsoft. (Retrieve from the internet Nov. 9, 2012).
Non-Final Office Action dated Apr. 19, 2013 for U.S. Appl. No. 13/453,799.
Non-Final Office Action dated Aug. 10, 2012 for U.S. Appl. No. 13/453,909.
Non-Final Office Action dated Apr. 4, 2014 for U.S. Appl. No. 13/453,799.
Final Office Action dated Jun. 6, 2014 for U.S. Appl. No. 13/453,678.
Non-Final Office Action dated May 28, 2014 for U.S. Appl. No. 13/453,909.
Final Office Action dated Jul. 1, 2014 for U.S. Appl. No. 13/453,860.
rsync WIKI entry; wikipedia.org; http:/en.wikipedia.org/wiki/rsync; Apr. 2012.
Benjamin Pierce; Unison File Synchronizer User Manual and Reference Guide; 1998.
Microsoft Corporation; SkyDrive Web Pages; http://windows.microsoft.com/en-AU/skydrive; Apr. 2012.
Windows Live Staff; How-To Guide: Sharing Files With Skydrive; http://windowslive.ninemsn.com.au/livesuite/article/702828/how-to-guide-sharing-fileswithskydrive; Apr. 2012.
Microsoft Corporation; Using Windows Live Hotmail and Skydrive;2008.
Novell Corporation; Novell iFolder—Users Guide; 2003.
Novell Corporation; Novell iFolder—Administration Guide; 2003.
Novell Corporation; Novell iFolder—Installing and Using the iFolder Client; 2003.
Apple Corporation; iCloud Web Pages; http://www.apple.com/icloud; Apr. 2012.
Matt Smith; Using the Magic Pocket: A Dropbox Guide; makeuseof.com—http://smidgenpc.com; Apr. 2012.
Dropbox Corporation; The Dropbox Tour; Web Pages—http://www.dropbox.com/tour; Apr. 2012.
Sugar Sync Inc.; Sugarsync User Guide—Version 2.0; 2011.
Sugar Sync Inc.; SUGARSYNC Quick Start Guide; 2011.
SuperUser, How do you make and run your own file extension?, Dec. 7, 2011, retrieved on Feb. 4, 2015, retrieved from Internet <URL: http://superusercom/questions/365596/how-do-you-make-and-run-your-own-file-extension>.
Final Office Action dated Jan. 27, 2015 for U.S. Appl. No. 13/453,909.
International Preliminary Report on Patentability in International Application No. PCT/US2013/034983 dated Oct. 28, 2014.
Notice of Allowance dated Sep. 25, 2014 for U.S. Appl. No. 13/453,799.
Non-Final Office Action dated Mar. 13, 2015 for U.S. Appl. No. 13/453,860.

* cited by examiner

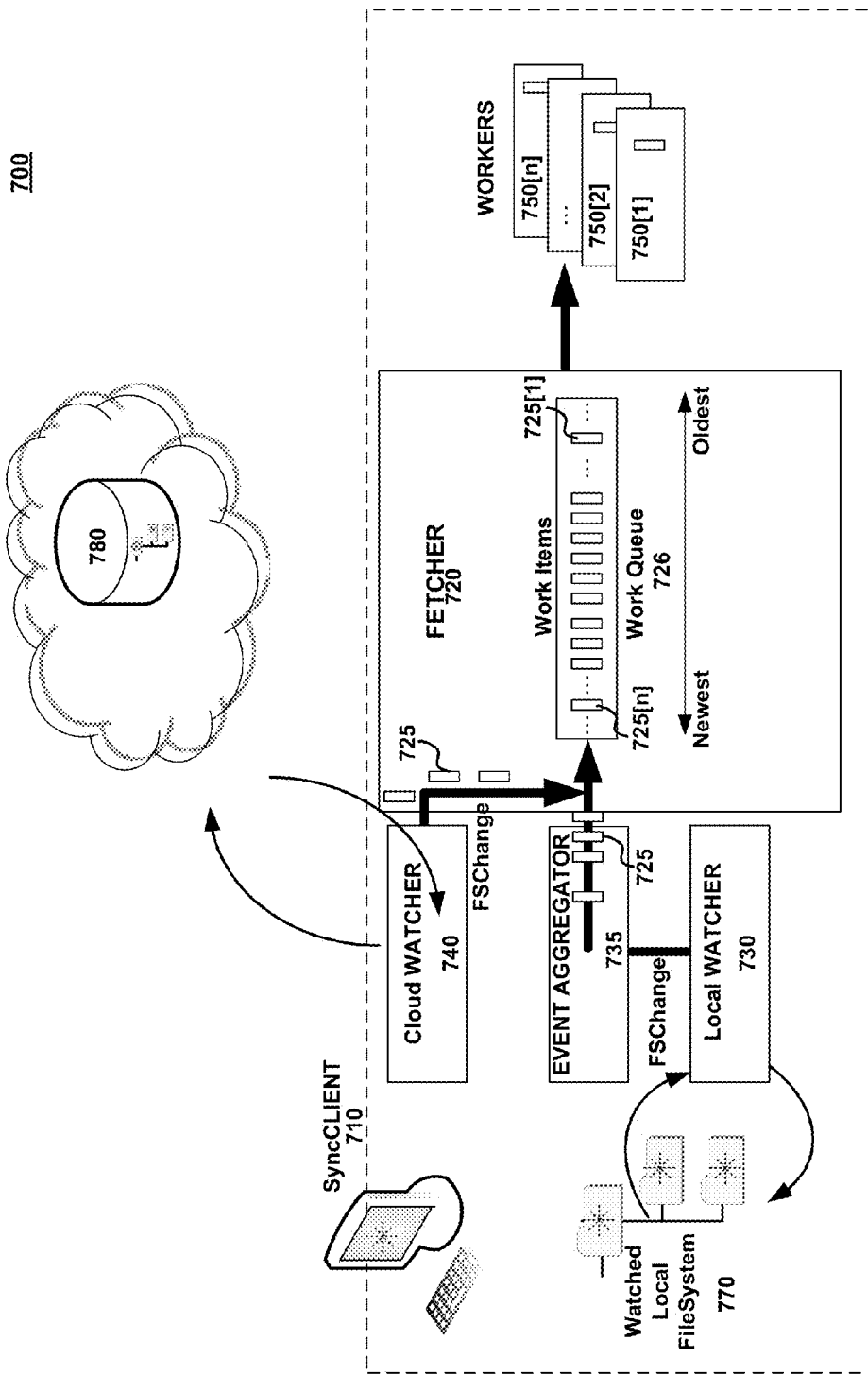

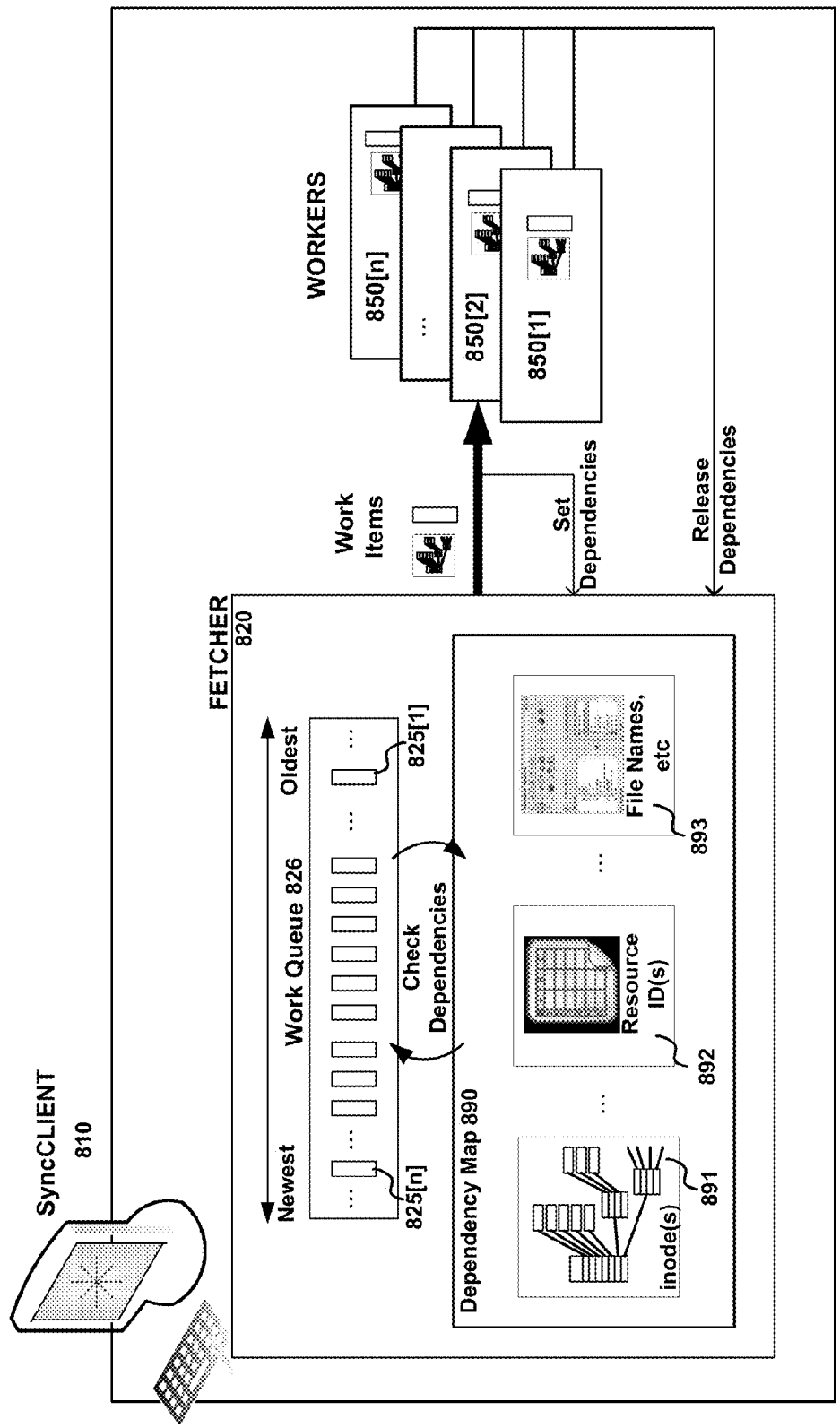

SHARING AND SYNCHRONIZING ELECTRONICALLY STORED FILES

CROSS REFERENCE TO RELATED APPLICATIONS

The following U.S. patent applications are filed on even date herewith, are assigned to the same assignee, and contain subject matter related, in certain respects, to the subject matter of the present application. These patent applications are incorporated by reference herein.

Ser. No. 13,453,678, filed Apr. 23, 2012;
Ser. No. 13,453,909, filed Apr. 23, 2012;
Ser. No. 13/453,860, filed Apr. 23, 2012; and
Ser. No. 13/453,799, filed Apr. 23, 2012.

TECHNICAL FIELD

This disclosure relates generally to the sharing and synchronization of electronically stored files among and between Cloud entities, server computers, desktop computers, personal computers, portable computers, mobile computers, web-enabled computers and other computers including tablet computers, personal digital assistants (PDAs) and smartphones.

BACKGROUND

The networked and mobile computing environment that defines much of contemporary society has provided innumerable convenience and productivity benefits. Notwithstanding the benefits, it has become increasingly difficult to manage electronically stored files that may simultaneously reside on numerous computers, systems and devices. For example, keeping track of and accessing a most current version or revision of an electronically stored file which may be stored on or across one or more office computers, laptop computers, home computers, mobile computers and removable disks is oftentimes difficult for even the most sophisticated user. Compounding this difficulty is the fact that such an electronically stored file may be globally accessed, and used or changed by a number of different users, oftentimes simultaneously.

SUMMARY

Briefly, aspects of the present disclosure are directed to architectures, methods, systems and structures that facilitate the sharing and synchronization of electronically stored files among and between Cloud entities and a number of computers, systems, devices and/or users.

According to an aspect of the present disclosure, electronically stored files are initially generated within Cloud entities and are subsequently replicated and synchronized with one or more client computing systems. Similarly, electronically stored files that are generated within client computing systems are subsequently replicated and synchronized with Cloud entities and other client computing systems.

Advantageously and according to another aspect of the present disclosure, such sharing and synchronization is user administrable thereby permitting the formation of sharing and synchronization groups and/or systems.

According to another aspect of the present disclosure client computing systems include a Local WATCHER and a Cloud WATCHER which concurrently monitor and detect changes to watched Local File Systems and Cloud File Systems respectively. Detected changes are used to generate work items that are ordered and selectively sent to a number of WORKERS for concurrent processing.

According to one aspect of the present disclosure electronically stored files placed into a shared folder are automatically shared and synchronized with any authorized users of that shared folder.

According to another aspect of the present disclosure electronically stored files placed into a shared folder are automatically stored within a Cloud Storage System.

According to another aspect of the present disclosure electronically stored files placed into a shared folder automatically "follow" a user online and offline across multiple systems, devices and the Net. Any changes made to an electronically stored files placed into the shared folder are automatically updated and synchronized to the Cloud and other computers and devices.

This SUMMARY is provided to briefly identify some aspects of the present disclosure that are further described below in the DESCRIPTION. This SUMMARY is not intended to identify key or essential features of the present disclosure nor is it intended to limit the scope of any claims.

The term "aspects" is to be read as "at least one aspect". The aspects described above and other aspects of the present disclosure described herein are illustrated by way of example(s) and not limited in the accompanying drawing.

BRIEF DESCRIPTION OF THE DRAWING

A more complete understanding of the present disclosure may be realized by reference to the accompanying drawing in which:

FIG. 7 is a schematic block diagram depicting the processing of work items by FETCHER and subsequent operations by WORKERS according to an aspect of the present disclosure;

FIG. 8 is a schematic block diagram depicting the serialization of Regular Work Items within FETCHER;

Figure 1:
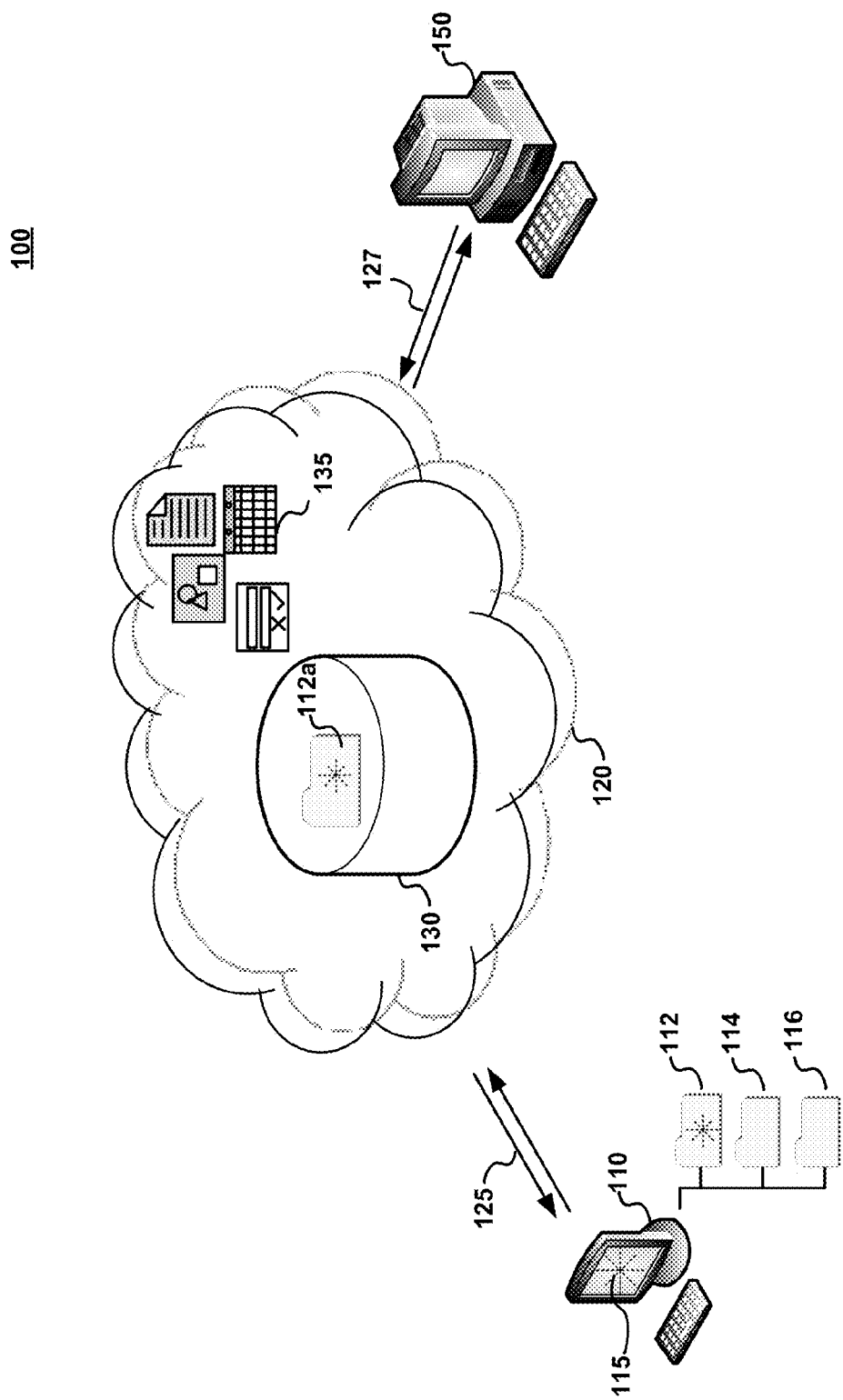
FIG. 1 is schematic diagram depicting an exemplary arrangement for sharing and synchronizing electronically stored files according to an aspect of the present disclosure.

The illustrative embodiments are described more fully by the Figures and detailed description. The inventions may, however, be embodied in various forms and are not limited to specific embodiments described in the Figures and detailed description

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The functions of the various elements shown in the Figures, including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and nonvolatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

Unless otherwise explicitly specified herein, the drawings are not drawn to scale.

We now provide some non-limiting, illustrative examples that illustrate several operational aspects of various arrangements and alternative embodiments of the present disclosure.

Generally, and as used herein, an electronically stored file is a type of abstraction. It provides a convenient way of bundling a set of data into identifiable units that in turn can be managed, stored, retrieved and operated upon by computer systems. With initial reference to FIG. 1, there is shown a schematic diagram depicting an exemplary arrangement 100 for sharing and synchronizing electronically stored files according to an aspect of the present disclosure.

Depicted in FIG. 1 are a personal computer 110 and a "Cloud" 120 with which the personal computer 110 interacts via one or more known networking technologies 125.

As will be readily appreciated by those skilled in the art, a Cloud 120 is a model of networked resources such as storage, computing and applications. For example, Cloud computing generally refers to the delivery of computing as a service whereby shared resources, applications, software, data and information are provided to computers and other devices as a service over a network such as the Internet. Similarly, Cloud storage generally refers to electronic storage resources (for example, electronic FileSystems) provided by the Cloud 120 via a network.

Advantageously Cloud computing and/or Cloud storage may provide individual users only those resources needed for a particular task thereby eliminating payment for idle or unused resources. Of further advantage, users may be provided access to any latest software and infrastructure offering(s), thereby fostering compatibility and productivity.

Finally, where the Internet is used for access to the Cloud 120, Cloud computing and/or Cloud storage generally provides users with access to Cloud resources from anywhere that Internet access mechanisms are available.

Networking technologies 125 depicted in FIG. 1 may advantageously provide Internet access to Cloud 120 either directly or via an internet service provider. Representative networking technologies for Cloud access include, but are not limited to, dial-up, leased line, ISDN, optical, broadband, broadband over power lines, fiber to the home, DSL/ADSL/SDSL, WiFi, WiMax, Cable, Satellite, Mobile Phone, and T-carrier, among others. Known internetworking protocols, i.e., TCP/IP may be used in conjunction with such technologies along with higher level protocols, i.e., HTTP to effect desirable communications with Cloud 120 or other network resources.

Depicted further in FIG. 1, are a number of electronic folders 112, 114, 116 that are resident in a storage system of personal computer 110. As will be readily appreciated by those skilled in the art, electronic folders such as those depicted in FIG. 1 are a type of virtual container in which groups of electronically stored files may be kept and organized.

As may be further appreciated, a contemporary computer operating system such as that which may execute on personal computer 110, i.e., Windows, OS/X, LINUX, etc., will generally include support for electronic file systems that may contain many thousands of folders. Electronically stored files may be conveniently organized by storing related files in a common folder. A folder contained within another folder is called a subfolder.

As may be readily understood by those skilled in the art, the name "folder" presents an analogy to a file folder used in offices and is used in almost all contemporary operating systems' desktop environments.

Folders too are a type of abstraction which provide a convenient way of bundling a set of electronically stored files into identifiable units that in turn can be managed, stored, retrieved and operated upon by computer systems. Folders are often depicted by computing systems as icons that visually resemble physical file folders.

With these principles in place, we may now describe certain operational aspects of sharing and synchronization of electronically stored files according to an aspect of the present disclosure. More particularly, and as depicted in FIG. 1, personal computer 110 executes client synchronization and sharing program or set of services 115 which, for our purposes herein, we generally call "SyncCLIENT".

Generally speaking, a client program executes on a particular computer and accesses one or more services made available by a complementary server program. The server program is oftentimes (but not always) on another computer system in which case the client program accesses the services by way of a network.

In the context of the present disclosure, SyncCLIENT 115, as depicted in FIG. 1, executes on personal computer 110 and interacts with complementary server services provided by Cloud 120 via networking technologies 125. According to an aspect of the present disclosure, one or more folders resident on personal computer 110 are automatically replicated and synchronized with Cloud 120. As depicted in FIG. 1, folder 112 is replicated and synchronized with Cloud storage services 130 which electronically store folder 112-a in a Cloud FileSystem.

As such, any additions/deletions/changes made to folder 112 on personal computer 110 executing SyncCLIENT 115 are reflected in folder 112-a in Cloud storage 130. Advantageously, such operations result in an automatic backup of any files or folders within folder 112 on personal computer 110 to the Cloud storage 120. Similarly, any additions/deletions/changes made to folder 112-a, or its contents in Cloud 120 will be reflected in folder 112 or its contents in personal computer 110.

By way of further example and as noted previously, exemplary Cloud 120 may advantageously provide computing services in addition to Cloud storage services 130. For example, any of a number of applications, i.e., word processing, spreadsheet, presentation graphics, calendaring, personal management, etc, 135 may be provided by Cloud 120 and accessed via a World Wide Web interface, for example, by computing device 150 or the personal computer 110, i.e., using—for example—a Web Browser. Advantageously, computing device 150 may be a "scaled down" or "thin client" device (or tablet device or Smartphone, etc.) to access to Cloud computing resources. As is known, such thin clients generally depend on other computers (i.e., Cloud computing) to fulfill their computational role.

When provided within the exemplary arrangement depicted in FIG. 1, computing device 150 provides, for example, the ability to utilize Cloud computing resources 135 to edit, for example, any editable documents which are stored within cloud storage 130 and folder 112-a. Such editing may advantageously be made from any geographic location that computing device 150 may access Cloud 120 and its resources via networking technologies 127. Consequently, a user may employ the computing device 150 to create or edit or otherwise utilize Cloud computing resources 135 to modify/create folders or files contained within folder 112-a. According to an aspect of the present disclosure, changes made to the folder 112-a, or changes made to any files or folders contained therein are automatically synchronized with folder 112 on personal computer 110.

Those skilled in the art will readily appreciate that contemporary computer systems such as the personal computer 110 or other computing device 150 depicted in FIG. 1, may employ operating systems such as WINDOWS, OS/X, LINUX, or similar systems or derivatives thereof that provide one or more user interfaces that allow a user to conveniently perform file system operations. More particularly, such user interfaces may allow a user to operate on files using familiar drag-and-drop, clipboard, and command-line operations.

When file system operations are based on such drag-and-drop or other familiar metaphors, users can conveniently select and copy, move, delete, etc, files, directories, (folders, etc) to another place in the file system. Advantageously, such familiar user interfaces may be used in conjunction with aspects of the present disclosure to, for example, move a file into folder 112 on personal computer 110 and then have it synchronized with Cloud folder 112-a.

At this point, those skilled in the art will readily appreciate that the present disclosure is not limited to file operations via user interfaces. Operating system components, services, user applications, etc., may also perform file operations. Accordingly, changes made to folder 112 or its contents by any of these mechanisms (i.e., applications) may precipitate a synchronization to Cloud folder 112-a, as well.

As described in the context of this example depicted in FIG. 1, synchronization and sharing according to an aspect of the present disclosure permits the automatic, bi-directional, generation, backup, synchronization and sharing of files and folders between a personal computers 110, 150, and a Cloud 120.

Figure 2:
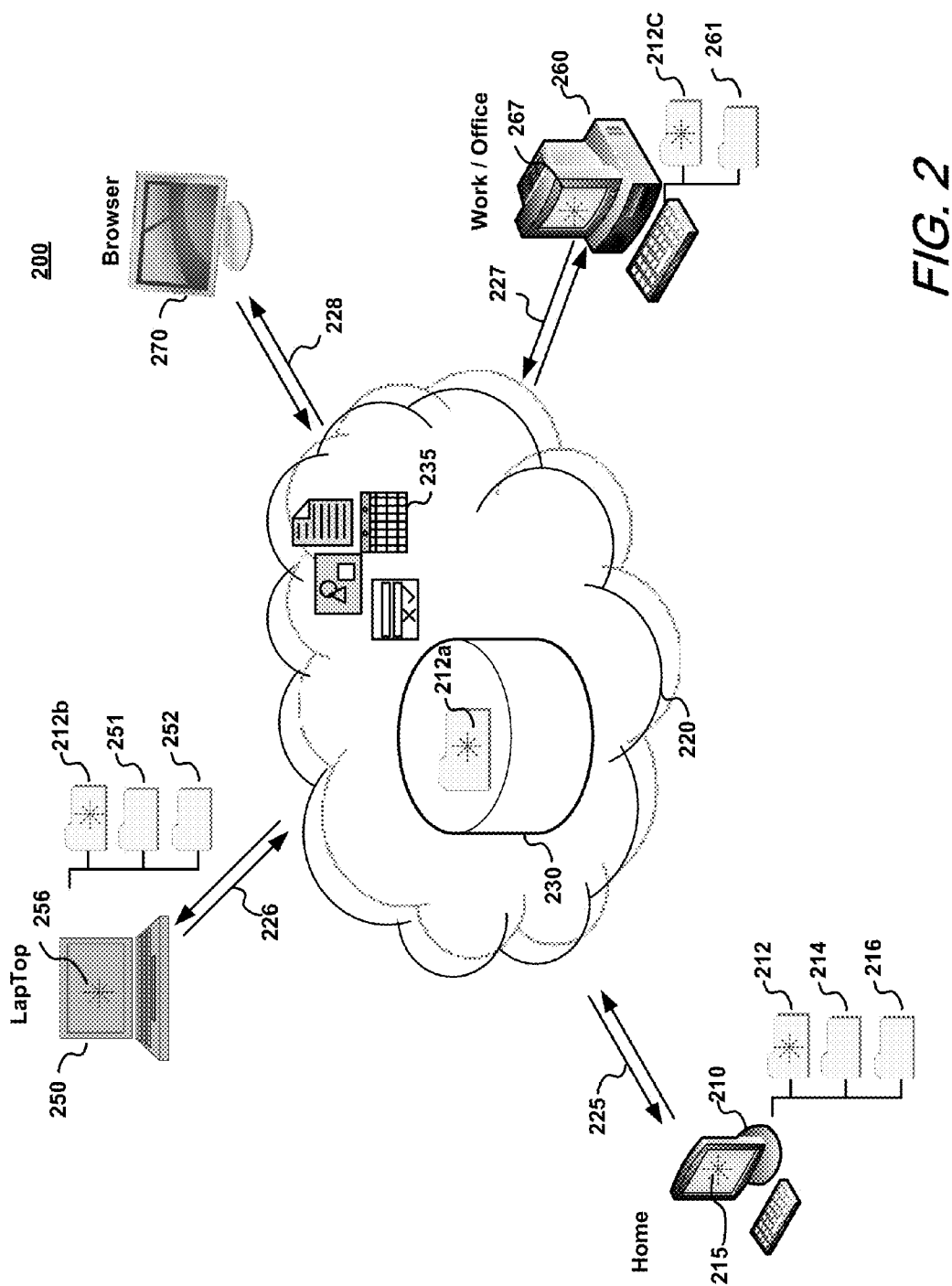
FIG. 2 is a schematic diagram depicting another exemplary arrangement for sharing and synchronizing electronically stored files according to another aspect of the present disclosure.

Turning now to FIG. 2, there is shown another exemplary arrangement 200 depicting electronic file sharing and synchronization according to an aspect of the present disclosure. Depicted in FIG. 2, are a number of computing systems namely, computers 210, 250, and 260 which are labeled in FIG. 2 as "home", "laptop" and "work" respectively. Each of the computers 210, 250 and 260 employ known network access technologies 225, 226, and 227 such as those previously described to access Cloud 220 and in particular Cloud storage services 230 FileSystem.

Depicted in FIG. 2, each of the computers 210, 250 and 260 executes an instance of SyncCLIENT 215, 256, and 267. According to an aspect of the present disclosure, one or more folders resident on home computer 210 are automatically replicated and synchronized with Cloud storage services 230 FileSystem through the effect of the executing SyncCLIENT 215. In this example depicted in FIG. 2, folder 212 which is resident on home computer 210 is replicated and synchronized with Cloud storage services 230 FileSystem which electronically stores folder 212-*a* and its electronic contents.

As previously noted with respect to this example depicted in FIG. 2, laptop computer 250 and work computer 260 are depicted as executing instances of SyncCLIENT 256 and 267 respectively. Consequently and according to yet another aspect of the present disclosure, each of the executing instances of SyncCLIENT 256 and 267 may replicate and synchronize folder 212*a* locally, on computers 250 and 260 as folders 212*b*, and 212*c*, respectively. As a result, folder 212 which is resident on home computer 210 is replicated and synchronized with folder 212*a* electronically stored by Cloud storage services 230 FileSystem as well as folders 212*b* and 212*c* which are resident on laptop computer 250 and work computer 260, respectively.

Accordingly, sharing and synchronization of electronically stored files according to yet another aspect of the present disclosure permits a user to make create/modify electronically stored files on one computer (i.e., files in folder 212*c* on work computer 260) and have those created/modified electronically stored files automatically replicated/synchronized on other computers (i.e., home computer and laptop computer 210, 250). As such, electronically stored files effectively "follow" a user from one computer to another without any additional user effort.

Notably, and as depicted in this FIG. 2, each of the computers depicted therein include a number of folders that are not replicated/synchronized/shared with the Cloud 220 or other computers. More particularly, home computer 210 is depicted as including folders 214 and 216 which are not shared and/or synchronized. Similarly, laptop computer 250 is depicted as including folders 251 and 252 which are not shared and/or synchronized. Finally, work computer 260 is depicted as including folder 261 which is not shared and/or synchronized.

Advantageously, and according to an aspect of the present disclosure, the particular folders that are shared/synchronized through the operation of SyncCLIENT with the Cloud 220 and/or other computing devices and/or users is user administrable.

As previously noted, Cloud 220 may provide Cloud computing resources 235 in addition to any Cloud storage resources 230. Consequently, a user may also create/modify electronically stored files through the effect of cloud computing resources 235 accessed by, for example, a web browser executing on computing device, a tablet or other portable computing device (i.e., Smartphone) 270. With such operations a user may advantageously create/modify electronically stored files within folder 212*a* maintained within Cloud storage services 230 FileSystem and those created/modified electronically stored files are replicated/synchronized to folders 212, 212*b*, 212*c* resident on home computer 210, laptop computer 250 and work computer 260, respectively. In this manner, electronically stored files may be created in the Cloud 220, and replicated/synchronized out to client computing devices, i.e., home computer 210, laptop computer 250, work computer 260, or other computing device 270, which may advantageously employ browser applications and technologies.

We note that we have used the term create to describe the generation of electronically stored files through the effect of cloud computing services. Those skilled in the art will appreciate that our particular vocabulary as used herein is not intended to be limiting. For example, an electronically stored file may also be generated, or originated in the Cloud through the effect of Cloud computing services. Similarly, an electronically stored file may be converted or recognized by Cloud computing services as being operable upon by those Cloud computing services. As such, these electronically stored files may be viewed as originated or generated or created as well for our purposes herein as we shall show and describe in somewhat greater detail.

Additionally, while we have so far described sharing and synchronization of electronically stored files among a number of computers used by, for example, a single person, the disclosure is not so limited. Advantageously, and according to another aspect of the present disclosure, synchronization and sharing of electronically stored files is performed among and between a number of computers and users.

Figure 3:
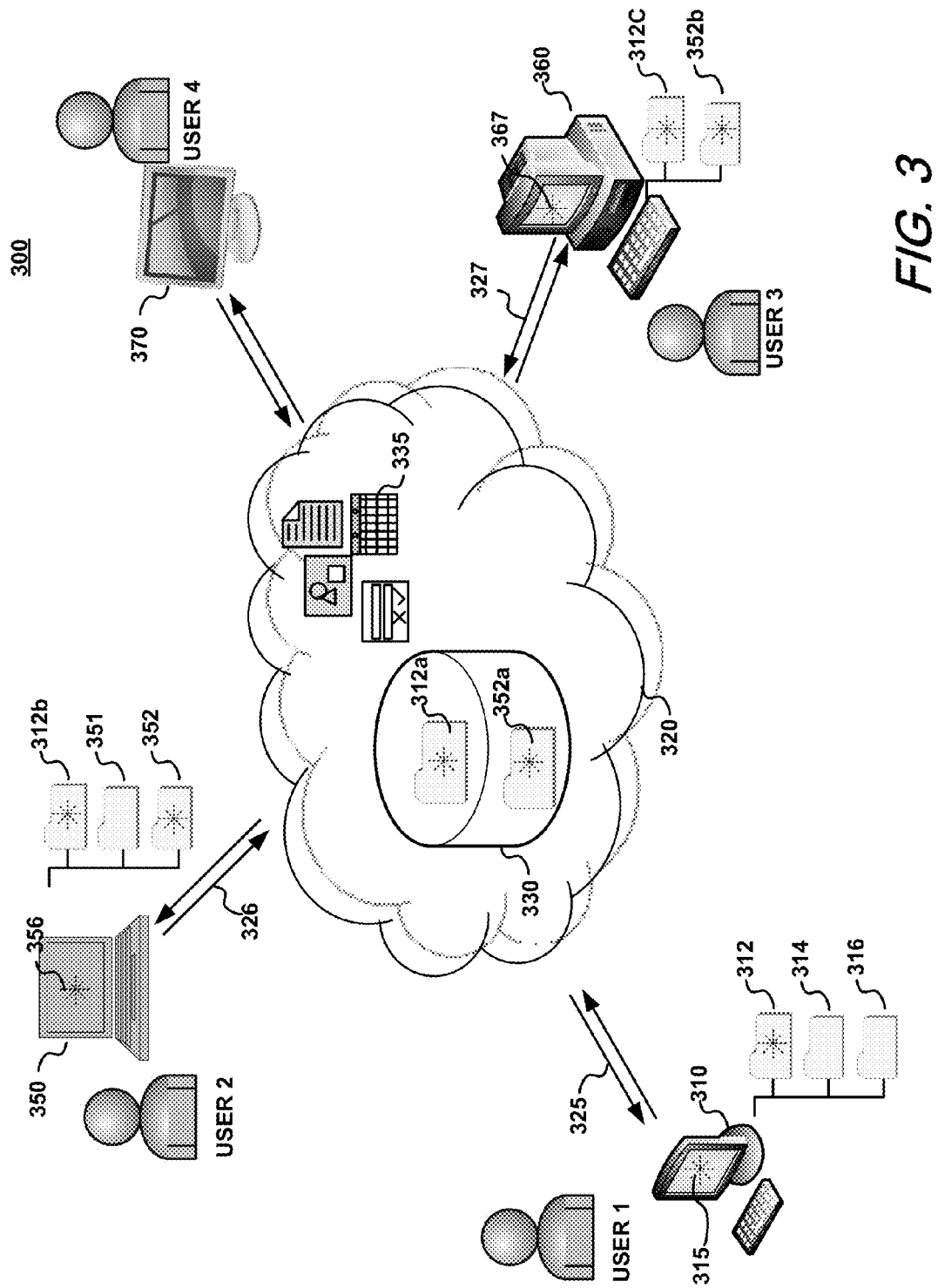
FIG. 3 is a schematic diagram depicting yet another exemplary architecture for sharing and synchronizing electronically stored files according to an aspect of the present disclosure.

With reference now to FIG. 3, there is shown another exemplary arrangement 300 depicting electronic file sharing and synchronization according to an aspect of the present disclosure. Depicted in that FIG. 3 are a number of computing systems namely personal computers 310, 350, and 360 that are used by different individual users and labeled in FIG. 3 as "User 1", "User 2", and "User 3" respectively. Each of the computers depicted 310, 350 and 360 employ network access technologies 325, 326, and 327 such as those previously described to access Cloud 320 and in particular Cloud storage services 330 FileSystem.

Further depicted in FIG. 3, each of the User computers 310, 350 and 360 executes an instance of SyncCLIENT software 315, 356, and 367.

According to an aspect of the present disclosure, one or more folders resident on any of the computers, for example computer 310 are automatically replicated and synchronized with Cloud storage services 330 FileSystem through the effect of the executing SyncCLIENT software 315. In this example depicted in FIG. 3, folder 312 which is resident on User 1 computer 310 is replicated and synchronized with Cloud storage services 330 FileSystem which electronically stores folder 312-*a*.

As may be further observed in FIG. 3, User 2 computer 350 and User 3 computer 360 are each depicted as executing instances of SyncCLIENT software 356 and 367, respectively. Consequently and according to yet another aspect of the present disclosure, each of the executing instances of SyncCLIENT software 356 and 367 may replicate and synchronize folder 312*a* locally, on User 2 and User 3 computers 350 and 360 as folders 312*b*, and 312*c*, respectively. As a result, folder 312 which is resident on User 1 computer 310 is replicated and synchronized with folder 312*a* stored in Cloud storage services 330 FileSystem as well as folders 312*b* and 312*c* which are resident on User 2 computer 350 and User 3 computer 360, respectively.

Accordingly, sharing and synchronization of electronically stored files according to yet another aspect of the present disclosure permits multiple users to make create/modify electronically stored files on one computer (i.e., User 1 computer 310) and have those created/modified electronically stored files automatically replicated/synchronized on other user's computers (i.e., User 2 computer and User 3 computer 350, 360).

Still further, these or additional authorized users may access any Cloud computing services via web browser, for example, to create/modify any electronically stored files contained within folder 312a stored in Cloud storage services 320 FileSystem. Consequently, any changes made to electronically stored files within folder 312a are automatically replicated and/or synchronized with folders on User computer systems 310, 350, and 360.

To this point we have shown certain aspects of sharing and synchronization of electronically stored files according to aspects of the present disclosure involving groups of users. Advantageously, and according to another aspect of the present disclosure, users may belong to multiple groups that share and synchronize electronically stored files.

With continued reference to FIG. 3, it is noted that User 1, User 2, and User 3 (with added involvement of User 4) were depicted as sharing and synchronizing electronically stored files associated with folder 312, namely folder(s) 312a, 312b, and 312c, which reside in Cloud 320, computers 350, and 360, respectively. In addition, a sharing and synchronization group including User 2 and User 3 is depicted in FIG. 3 as well.

More particularly, while User 2 and User 3 are depicted as sharing and synchronizing folder 352 which is shown as being resident on computer 350 associated with User 2. That folder 352 is shared and synchronized with Cloud 320 as folder 352a and computer 360 as folder 352b associated with User 3. Accordingly, User 2 and User 3 are depicted as being part of two different sharing and synchronization groups. As previously noted, the inclusion of additional users and/or computers to sharing and synchronization groups such as those depicted is advantageously user administrable.

Figure 3A:
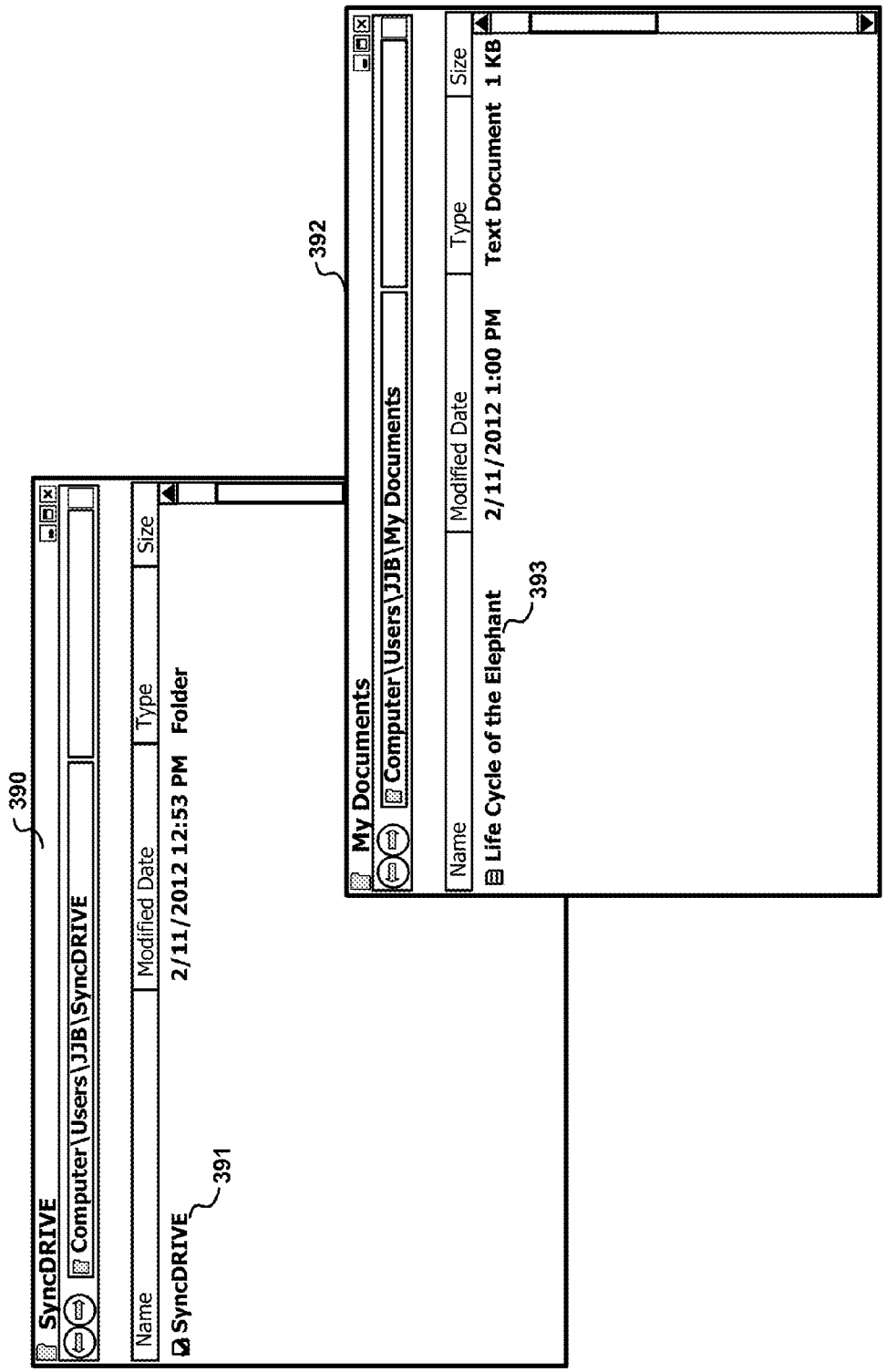
FIGS. 3a-3c are schematic diagrams depicting exemplary drag-and-drop operations and synchronization status of electronically stored files according to an aspect of the present disclosure.
Figure 3B:
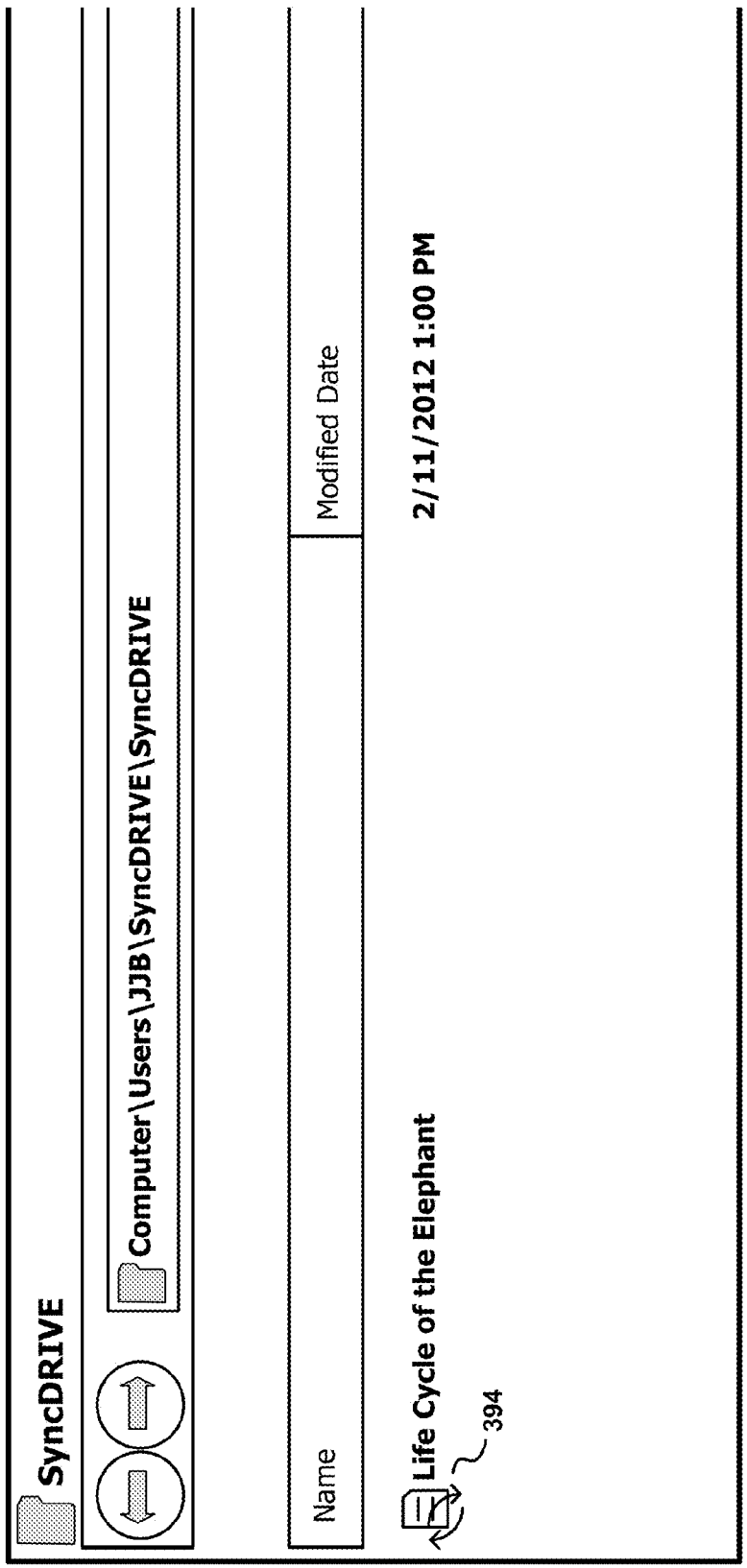
Figure 3C:
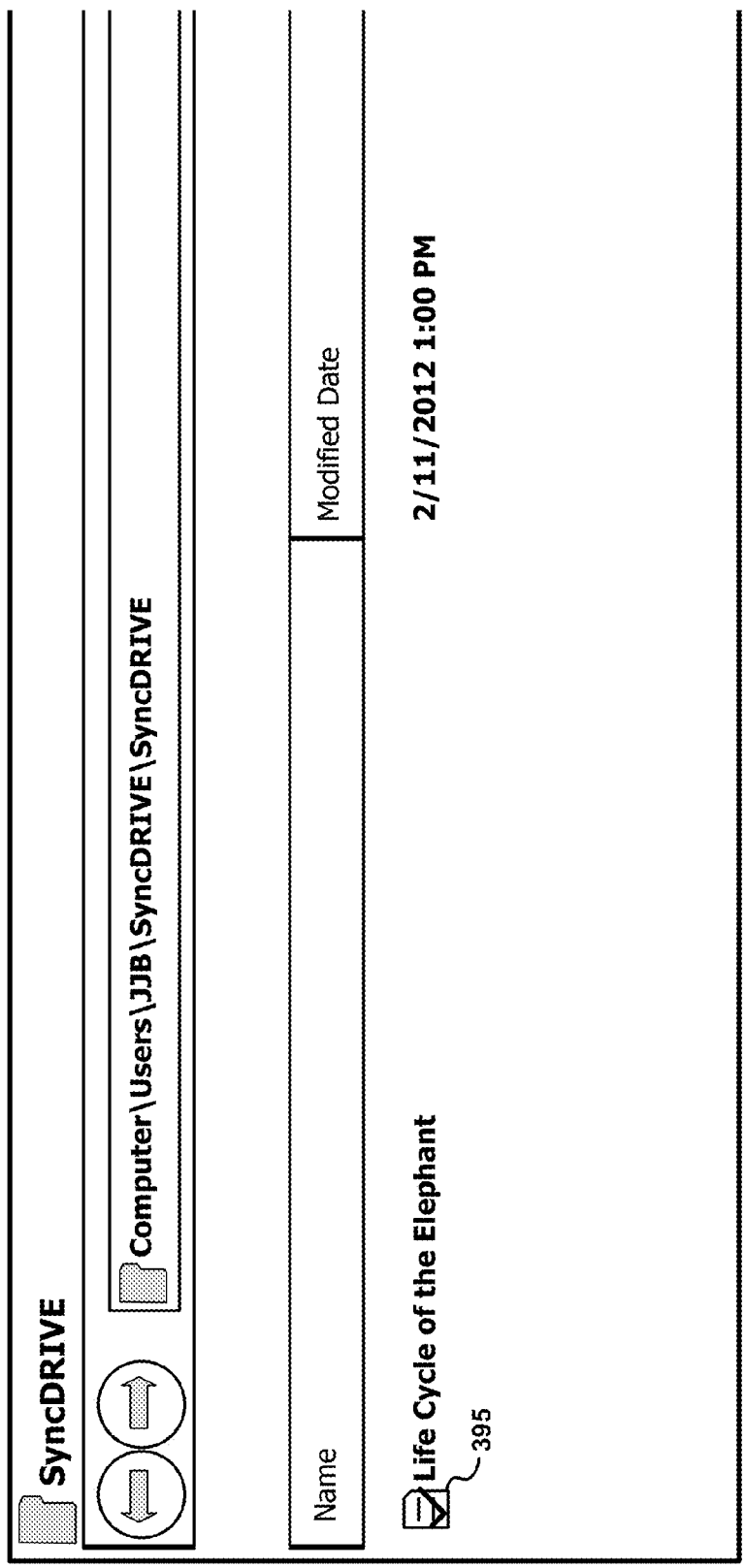

By way of an operational example, FIGS. 3a-3c depict a drag-and-drop operation and subsequent synchronization of electronically stored files according to an aspect of the present disclosure. As those skilled in the art will readily appreciate, a drag-and-drop operation is an action whereby a virtual object (such as an electronically stored file) is "grabbed" by graphical user interface mechanisms (i.e. mouse or touch sensitive screen) and dragged to a different location on onto/into another virtual object (such as a folder). As may be further appreciated, such an operation may be conveniently used to invoke many kinds of actions or to create various types of associations between two abstract objects.

FIG. 3a depicts a pair of overlapping windows 390, 392 such as those common to contemporary graphical user interfaces. Shown in window 392 is iconic representation of electronically stored file 393 entitled "LIFE CYCLE OF THE ELEPHANT." Similarly, window 390 includes iconic representation of a local SyncDRIVE folder 391. According to an aspect of the present disclosure, electronically stored files placed into the local SyncDRIVE folder 391 will be automatically replicated and synchronized with the Cloud (not specifically shown) and optionally other SyncDRIVE clients (not specifically shown).

In the context of this example, a basic drag-and-drop sequence is accomplished by: moving a pointer to the electronically stored file 393, "grabbing" the file 393 by pressing a mouse button or other selection mechanism, "dragging" the file 393 to the SyncDRIVE folder 391, and "dropping" the file 393 by releasing the button or other selection mechanism.

After performing such a drag-and-drop operation an examination of the contents of the SyncDRIVE folder 391 as depicted in FIG. 3b shows that copy of electronically stored file being synchronized with Cloud as indicated by changed icon 394 which in this example is indicative of the electronically stored file undergoing synchronization. Upon completion of the synchronization operation and as depicted in FIG. 3c, the icon associated with the electronically stored file 395 is updated to further reflect that the electronically stored file is synchronized.

As may be further appreciated, the depiction of a synchronization status such as that shown may be performed by a variety of iconic or other mechanisms available in contemporary graphical user interfaces or computing systems. Examples include animated and/or audible mechanisms. Still further, while the example shown in FIGS. 3a-3c depict the synchronization status associated with an exemplary SyncCLIENT and Cloud, those skilled in the art will readily appreciate that this disclosure is not so limited and further enhancements may depict initial, intermediate, and subsequent downstream synchronizations as well, for example with additional SyncCLIENT(s) that are part of a group such as those previously described.

Figure 4A:
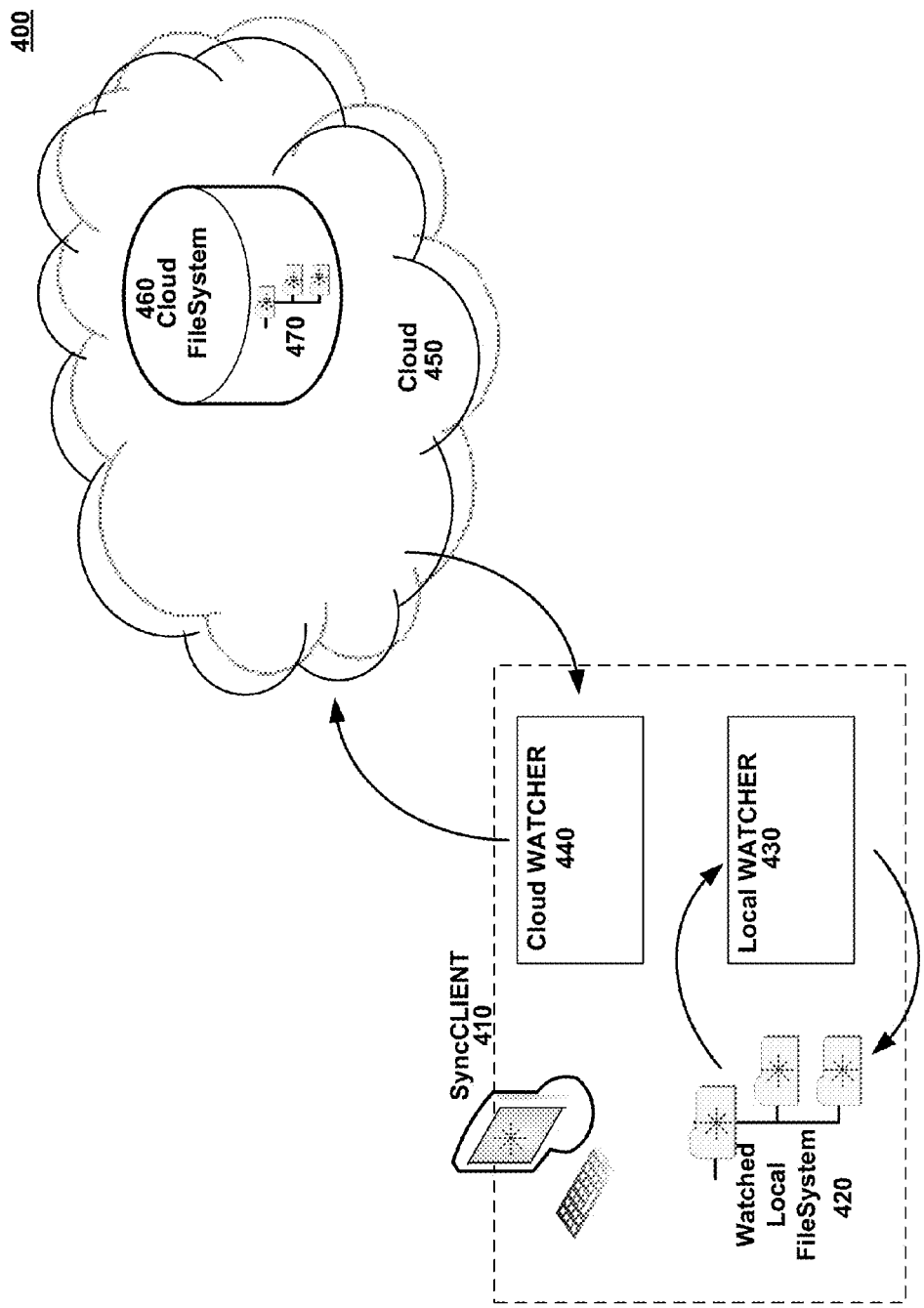
FIG. 4a is a schematic diagram depicting exemplary functional operation of a SyncCLIENT according to an aspect of the present disclosure.

With these particular functional aspects of the present disclosure understood, we now reference FIG. 4a which depicts a simplified functional block diagram of an exemplary SyncCLIENT 410 according to an aspect of the present disclosure.

As depicted therein, SyncCLIENT 410 includes at least two functional elements namely a Cloud WATCHER 440 and a Local WATCHER 430 which result from the execution of SyncCLIENT software on a computing device. Briefly, the Local WATCHER 430 monitors and detects any changes to a watched local FileSystem 420 while the Cloud WATCHER 440 monitors and detects any relevant changes within Cloud FileSystem 460 resident in Cloud 450. When any changes are detected in either watched Local FileSystem 420 or Cloud FileSystem 460, synchronization between the two systems results. Advantageously, and according to an aspect of the present disclosure, in a preferred embodiment the Cloud WATCHER 440 and the Local WATCHER 430 may operate concurrently or in parallel depending upon the hardware environment in which they operate.

At this point it is useful to discuss a particular exemplary synchronization according to an aspect of the present disclosure namely, the synchronization that takes place between Cloud and SyncCLIENT when a document is originated in the Cloud. More particularly, a document is originated in the cloud through the use of Cloud Computing resources, electronically stored therein through the use of Cloud Storage Services, and finally synchronized with one or more SyncCLIENT(s).

Figure 4B:
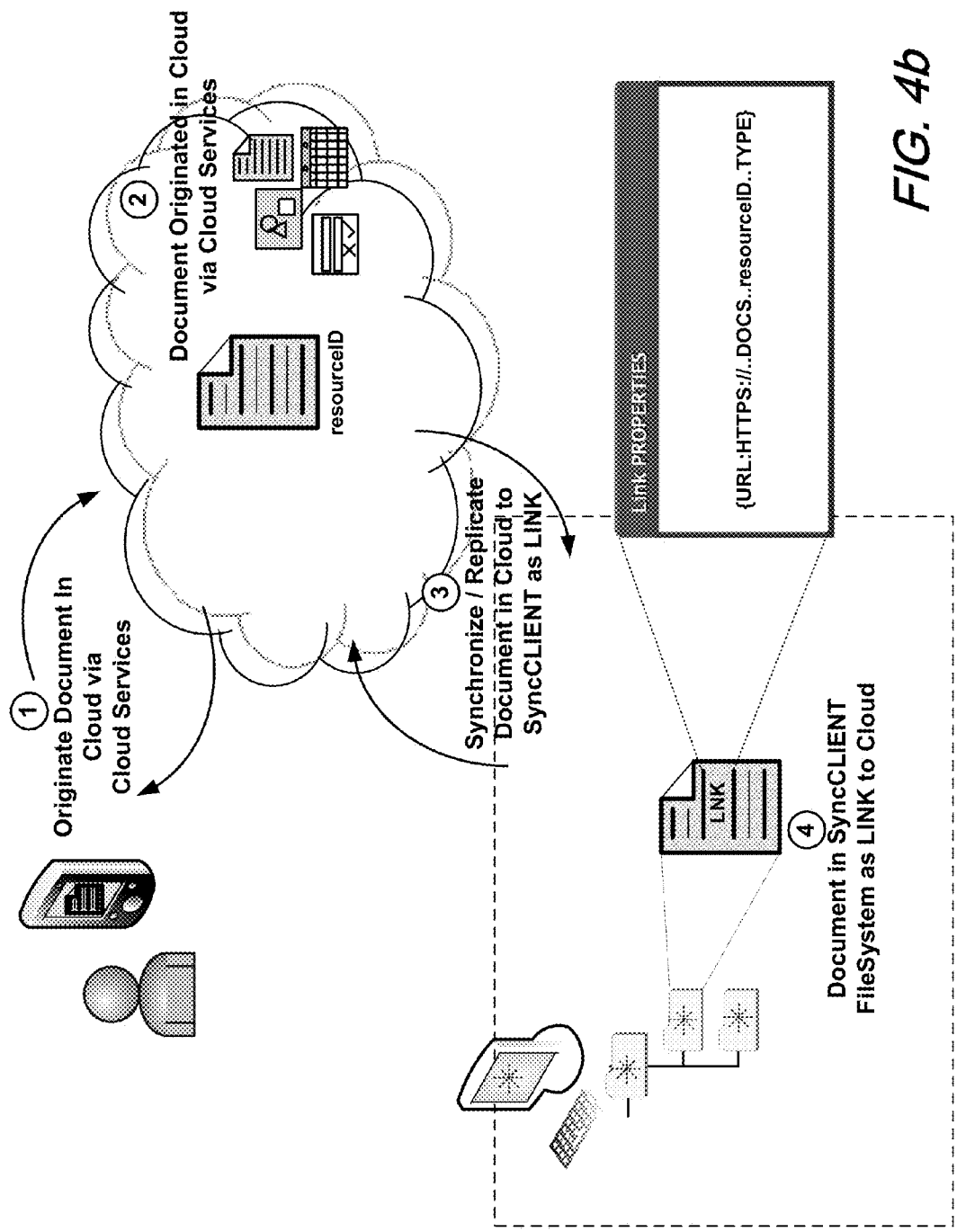
FIG. 4b is a schematic diagram depicting an exemplary sequence of events when a document is originated in the Cloud and then propagated to a SyncCLIENT according to an aspect of the present disclosure.

With reference to FIG. 4b, there is shown a schematic diagram depicting the exemplary origination/creation of a document within the Cloud by a user. As depicted therein, the document is originated/created via a mobile device. As may be readily appreciated and as previously noted, any of a variety of known mobile devices may be suitable for interacting with Cloud Computing Services to originate a document which may be subsequently stored in the Cloud via Cloud Storage Services. Familiar devices include mobile telephones, tablets and other portable computing devices. Notably, this disclosure is not limited to mobile devices and such origination/creation of a document within the Cloud may employ desktop or other computing devices as well. In particular, any device that supports browser functionality may suffice for interacting with the exemplary Cloud Computing Services.

Additionally, while we have use the term document to describe the particular electronic entity that is originated and stored within the Cloud, the present disclosure is not so limited. More particularly, word processing documents, spreadsheet documents, and graphics documents, among others, may advantageously be originated in the Cloud via Cloud Computing Services according to this disclosure.

Accordingly, once a document is originated in the Cloud via Cloud Computing Services, it is electronically stored therein via Cloud Storage Services. In an exemplary embodiment, a document electronically stored via Cloud Storage Services will have associated with it a resourceID which uniquely identifies the electronically stored file in the Cloud Storage.

Once the document is electronically stored in the Cloud, it is subsequently synchronized/replicated with the SyncCLIENT. Notably, in a preferred embodiment the electronically stored file which originated via Cloud Computing Services is not physically (electronically) replicated/copied to the SyncCLIENT(s). Instead, and according to another aspect of the present disclosure, electronically stored document files which are originated in the Cloud via Cloud Computing Services and are subsequently stored therein, are subsequently synchronized with one or more SyncCLIENT(s) as LINK(s) to the electronically stored document file in the Cloud.

In this manner the electronically stored document that originated in the Cloud is advantageously not physically moved to the SyncCLIENT(s). A LINK to the document (file) is propagated to the SyncCLIENT(s), where it is stored in the SyncCLIENT(s) local file system as an electronically stored file that comprises a LINK to the file in the Cloud. Of further advantage, the electronically stored file that comprises the LINK to the file in the Cloud may locally exhibit a type that is indicative of its Cloud storage. More particularly, such a locally stored file may be of a type ".gdoc", or any other pre-determined type designation so indicative.

As such, an electronically stored file is created in the SyncCLIENT file system (in the watched file system) that may advantageously appear to a user as a regular document, or text or other file as appropriate. Instead of containing the electronic contents of the electronically stored file as stored in the Cloud, the local electronic file contains a LINK to the Cloud file.

In a preferred embodiment, and as exemplary depicted in FIG. 4b, such a LINK may identify the resource (document), a means for locating the resource and any particular access mechanism(s). As shown in the example of FIG. 4b, the LINK may include components indicative of a Uniform Resource Locator (URL), protocol(s), i.e., HTTPS, Services (DOCS), resourceID, and TYPE. As those skilled in the art will appreciate, additional components may be included in the LINK as necessary. When such a LINK is provided as shown, an invocation of a web browser may advantageously provide access to the file electronically stored in the Cloud to a user of a SyncCLIENT—whether mobile or stationary and advantageously not consume bandwidth unnecessarily.

While we have described the operations depicted in FIG. 4a and FIG. 4b as pertaining to those electronically stored files that originate in the Cloud, we note once again that the teachings of the present disclosure are not so limited. More particularly, the present disclosure may likewise pertain to those electronically stored files that originate on a SyncCLIENT and are subsequently synchronized/replicated to the Cloud as previously described.

More specifically, a user may originate an electronically stored file on a SyncCLIENT computer and subsequently have that electronically stored file synchronized/replicated to the Cloud. Once it is electronically stored in the Cloud, the electronically stored file may be converted and/or modified (if necessary) to a format that may be conveniently operated on by one or more of the Cloud Computing Resource(s) and/or Cloud applications. Thereafter, that converted, electronically stored file may be synchronized with one or more SyncCLIENT(s) as a LINK to the electronically stored file in the Cloud. Of course, those skilled in the art will appreciate that with certain electronic file formats (i.e., text files, etc) conversion and/or modification is not necessary. Accordingly, when files exhibiting such formats are electronically stored in the Cloud, they may be advantageously synchronized with SyncCLIENTs via the LINK mechanism(s) described previously and subsequently accessed from the SyncCLIENTs as if they originated in the Cloud.

Figure 4C:
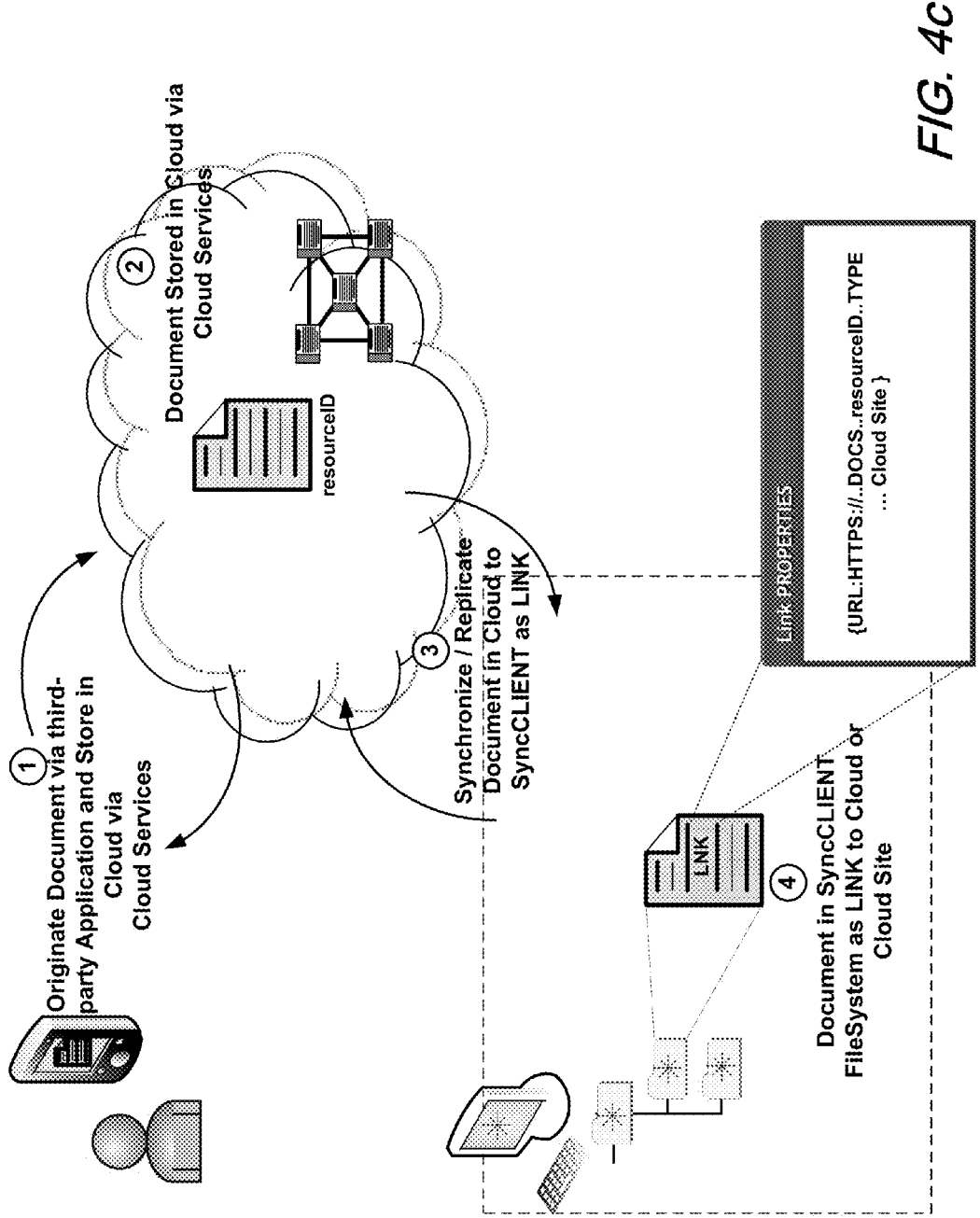
FIG. 4c is a schematic diagram depicting an exemplary sequence of events when a document is originated via third-party application and subsequently shared/synchronized with SyncCLIENT as a link to Cloud or Cloud Site.

Notably, a document or other object need not be generated via cloud computing services according to an aspect of the present disclosure. More particularly, and with reference now to FIG. 4c, there is shown a schematic sequence of events whereby a document is originated via a third-party application, stored in the Cloud via Cloud Services and subsequently synchronized/replicated with a SyncCLIENT as a LINK to the object in the CLOUD. Accordingly, the SyncCLIENT recognizes that the document object in the CLOUD need not be copied to the SyncCLIENT and instead a LINK is generated to that object and stored locally as a file in the local file system of the SyncCLIENT. As before, the document object may be accessed from the SyncCLIENT (or other computing devices to which the document has been synchronized) via a web browser—for example. Still further, additional/alternative cloud sites may be referenced in the LINK such that the document or other resources may be accessed via that referenced cloud site as well.

Figure 4D:
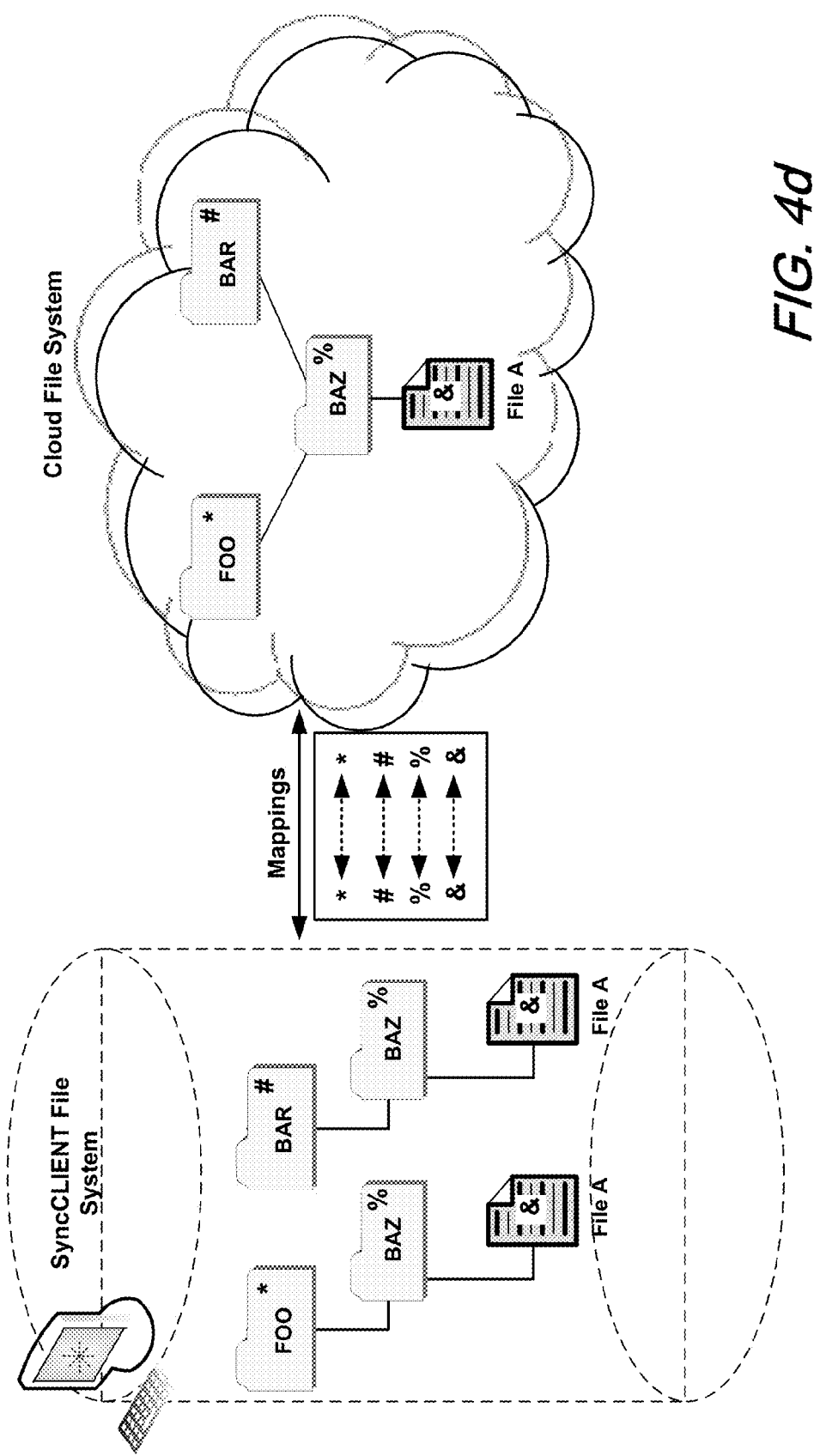
FIG. 4d is a schematic diagram depicting exemplary mappings between SyncCLIENT and the Cloud according to an aspect of the present disclosure.

At this point it is noteworthy that folders and files in the Cloud and folders and files in a local file system may exhibit somewhat different characteristics. With reference now to FIG. 4d, there is shown an exemplary Cloud file system and an exemplary SyncCLIENT file system including a number of folders and files which will be used to describe some of these characteristics.

In particular, the exemplary Cloud file system depicted in FIG. 4d exhibits a "down-up" structure rather than a "top-down" structure of the client file system that those skilled in the art will readily recognize. More specifically, this "down-up" structure exhibited by the Cloud file system results in multiple folders belonging to a single file.

As depicted in FIG. 4d, it may be observed that a single file, File A, as belonging to (or contained within) folder BAZ, that in turn belongs to both folders FOO and BAR. Accordingly, files electronically stored in the Cloud may have multiple parent folders which in turn may have multiple parent folders. In this regard, folders are analogous to labels that are applied to files.

Furthermore, as used in the Cloud, names of folders and/or files are generally not unique. Accordingly, names are more accurately viewed as title attributes to files and folders. Consequently, and as noted elsewhere in this disclosure, files and folders in the Cloud have unique identifiers, resource IDs (resourceID) which uniquely identify the file or folder to which it is associated.

As may be appreciated, a local name of a file and/or folder may be different from its name in the Cloud since there may be conflicts with other files/folders having the same name in the local file system. Such conflicts may occur both among children and among parents. Accordingly, and in an exemplary embodiment and according to an aspect of the present disclosure, a mapping is made between a folder resourceID and its name (in the Cloud) and its local name as electronically stored on the SyncCLIENT.

An exemplary mapping between Cloud folders/file and local folders/file is depicted in FIG. 4d. In an exemplary embodiment, such mapping may be made through a FileMapping object which includes one or more LocalEntry objects and a CloudEntry object. As shown in FIG. 4d, local folder FOO is mapped to Cloud folder FOO, local folder BAR is mapped to Cloud folder BAR, two local folders BAZ are mapped to single Cloud folder BAZ, and both FILE A files are mapped to single Cloud file, FILE A.

Figure 4E:
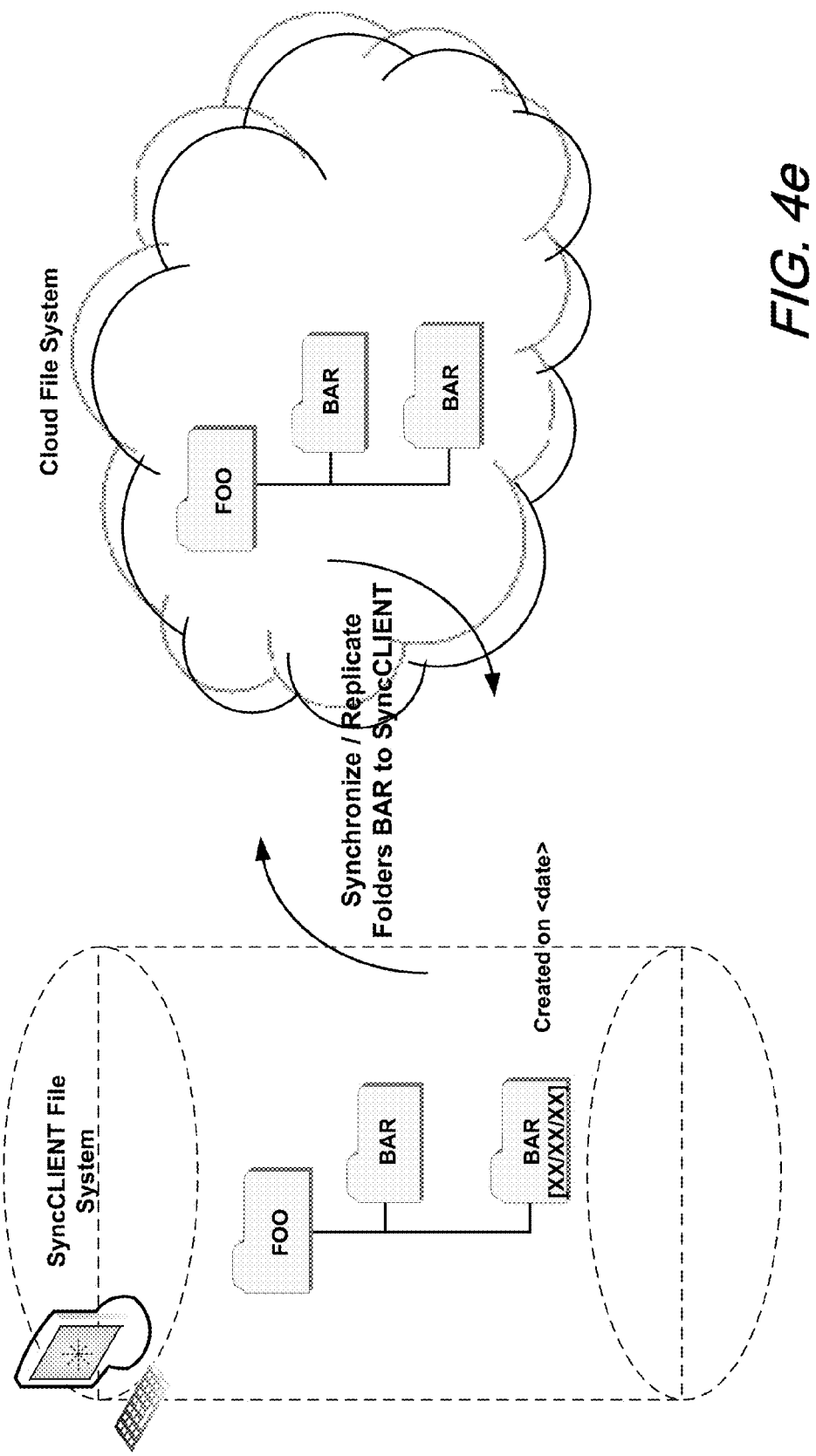
FIG. 4e is a schematic diagram depicting an exemplary synchronization between SyncCLIENT and the Cloud according to an aspect of the present disclosure.

FIG. 4e depicts an additional example of differences between files/folders as they are stored in the Cloud storage system and how those differences affect sharing/synchronization according to aspects of the present disclosure. With reference to FIG. 4e, there is depicted in a Cloud file system a folder named FOO, having two child folders both named BAR. Consequently, and according to an aspect of the present disclosure, when duplicate folders BAR are replicated/synchronized on the local file system they are uniquely named using the creation date of the Cloud resource. As depicted in this example in FIG. 4e, one folder is named BAR in the local file system while the other is named BAR [XX/XX/XX] where XX/XX/XX is the date on which the Cloud resource of that folder was created.

Figure 4F:
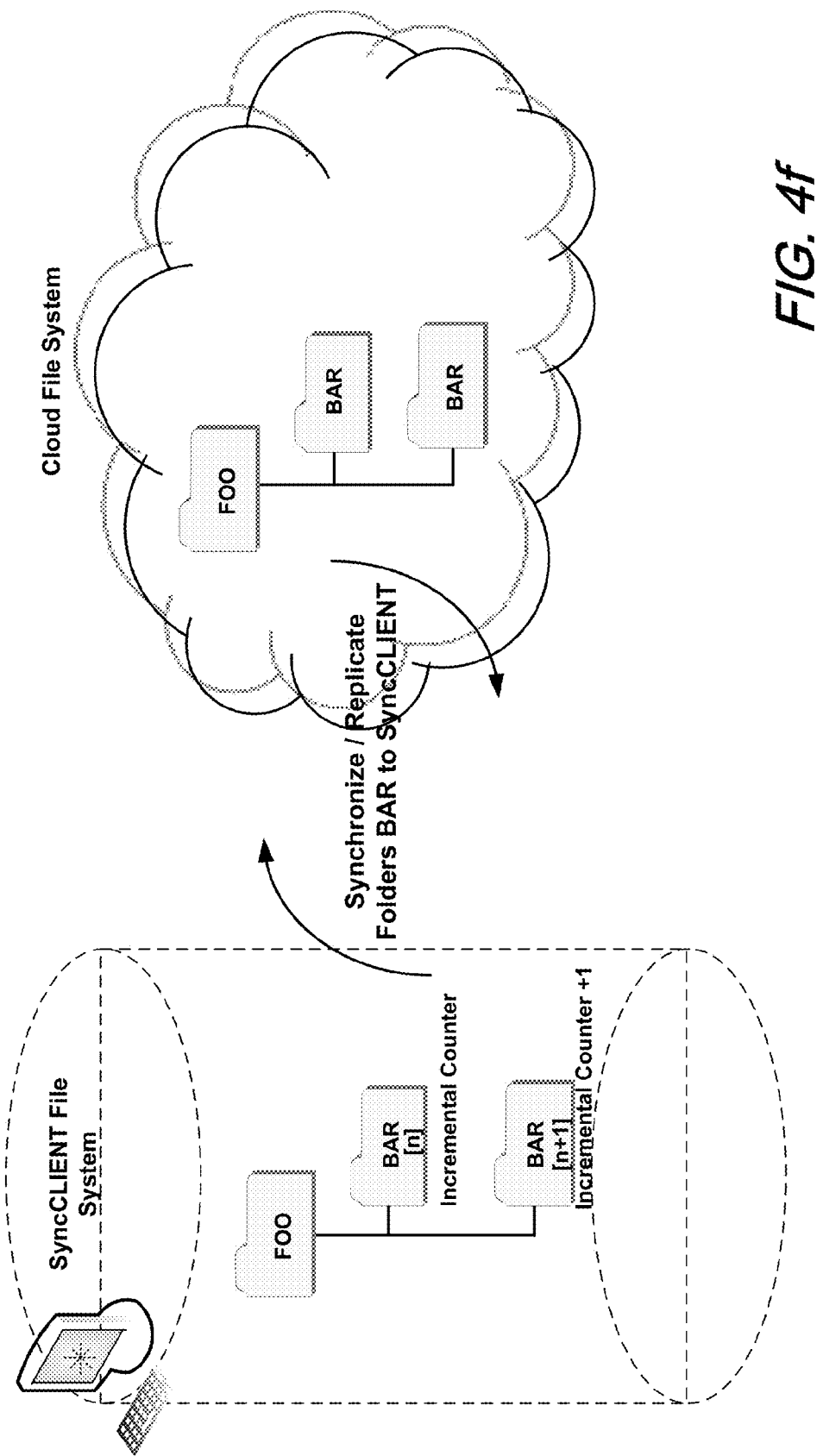
FIG. 4f is a schematic diagram depicting an additional exemplary synchronization between SyncCLIENT and the Cloud according to an aspect of the present disclosure.

FIG. 4f depicts an additional example of differences between files/folders as they are stored in the Cloud storage system and how those differences affect sharing/synchronization according to aspects of the present disclosure. With reference to FIG. 4f, there is again depicted in a Cloud file system a folder named FOO, having two child folders both named BAR. Consequently, and according to an aspect of the present disclosure, when duplicate folders BAR are replicated/synchronized on the local file system they are uniquely named using—in this example—an incremental counter. As depicted in this example in FIG. 4f, one folder is named BAR[n] in the local file system while the other is named BAR [n+1]. Those skilled in the art will appreciate that a combination of this incremental counter method along with the creation date of the Cloud object described in the preceding paragraphs are contemplated by this disclosure.

Figure 4G:
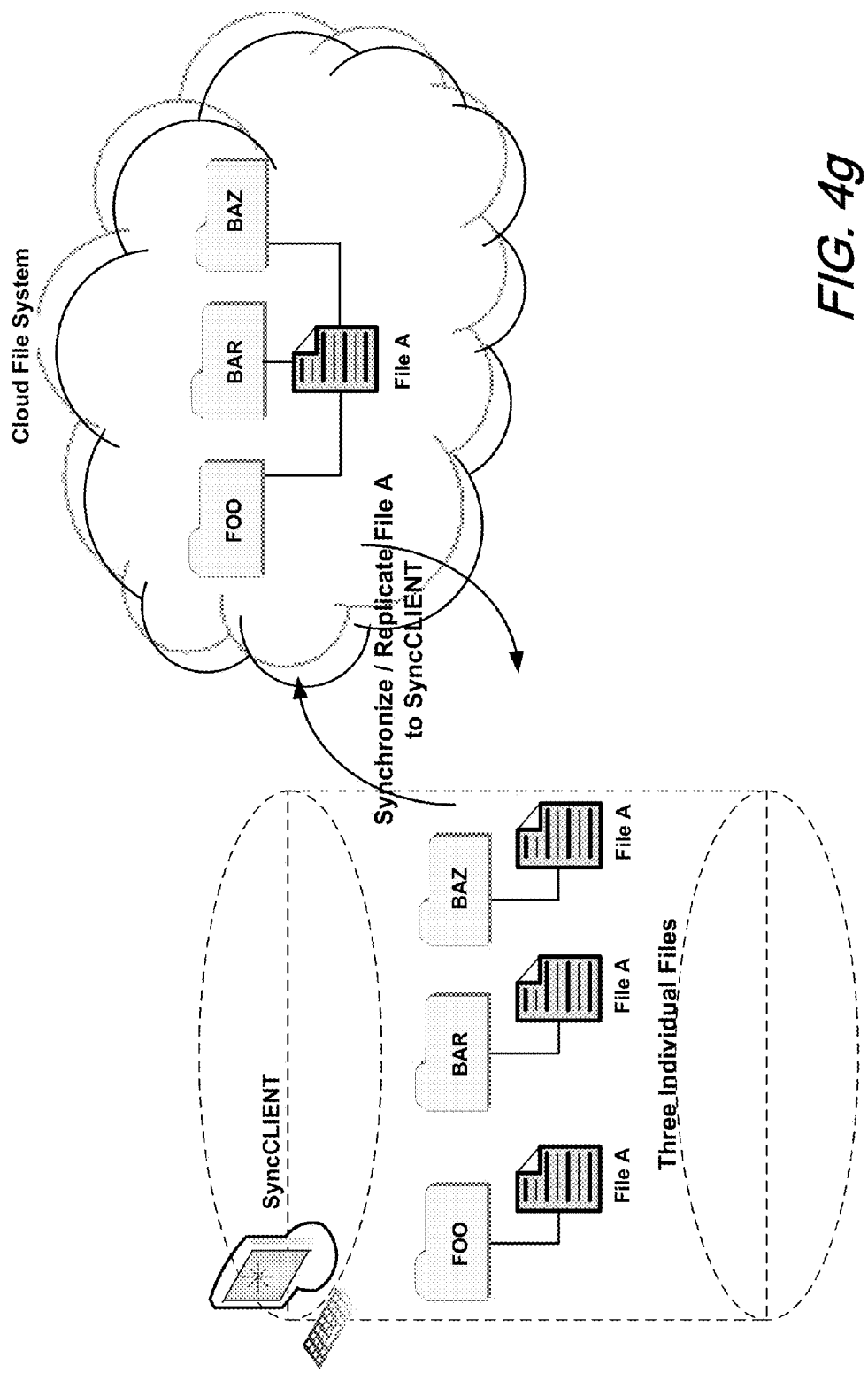
FIG. 4g is a schematic diagram depicting an exemplary synchronization of a single file associated with multiple folders in the Cloud with a SyncCLIENT.

Finally, and with reference now to FIG. 4g, there is shown a schematic diagram depicting the synchronization of a single particular file, File A, that is electronically stored in the Cloud file system and is associated with (contained in) three separate folders namely, FOO, BAR, and BAZ. Notably, when this File A is synchronized/replicated with a SyncCLIENT and electronically stored in a local file system on that client, three individual folders namely, FOO, BAR, and BAZ are created on the SyncCLIENT file system wherein each contain a separate copy of that replicated File A. Advantageously, when any of the three files are modified locally, subsequent synchronization with the Cloud takes place with the corresponding single File A that is resident in the Cloud file system.

Figure 5:
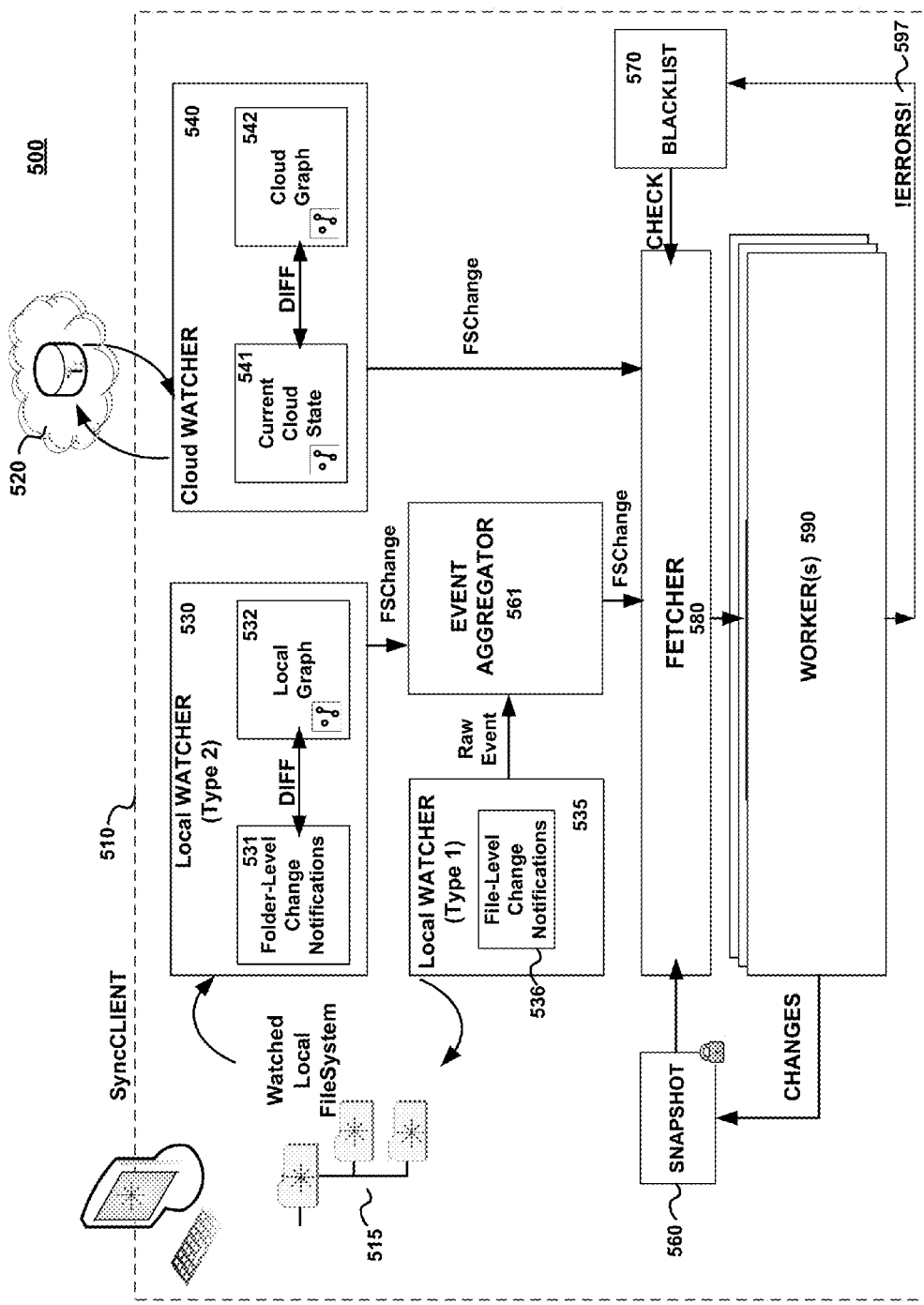
FIG. 5 is a schematic block diagram depicting an exemplary architecture of a SyncCLIENT according to an aspect of the present disclosure.

Turning now to FIG. 5, there is shown a schematic block diagram 500 of a SyncCLIENT 510 that may illustratively perform the operations described previously with respect to FIGS. 1-4. As depicted in FIG. 5, an illustrative SyncCLIENT includes Cloud WATCHER 540, Local WATCHER (i.e., Type-2 WATCHER 530 or Type-1 WATCHER 535), EVENT AGGREGATOR 561, FETCHER 580, WORKER(s) 590, SNAPSHOT 560, and BLACKLIST 570.

As noted previously, Cloud WATCHER 540 monitors and detects any relevant changes to Cloud FileSystem 520 while Local WATCHER (530 or 535) monitors and detects any changes to watched Local FileSystem 515. With respect to the Cloud WATCHER 540, if any relevant changes to Cloud FileSystem 520 are detected, FSChange notification(s) of those detected change(s) are sent to FETCHER 580. With respect to the Local WATCHER (530 or 535), if any Local FileSystem changes are detected, notification is sent to EVENT AGGREGATOR 561.

According to an aspect of the present disclosure, the EVENT AGGREGATOR 561 receives change notifications from the Local WATCHER (Type-1) 535 or from the Local WATCHER (Type-2) 530 as appropriate. In a preferred embodiment, the Local WATCHER (Type-1) 535 provides raw event file-level change notifications to the EVENT AGGREGATOR 561 while the Local WATCHER (Type-2) provides FSChange notifications to the EVENT AGGREGATOR 561.

While we will describe the operation of the EVENT AGGREGATOR 561 in more detail later, we note that the EVENT AGGREGATOR 561 generally will receive change notifications from the Local WATCHER and "hold" onto those notifications for some period of time. If during the hold period multiple changes are made to any related item(s) the EVENT AGGREGATOR 561 will advantageously combine or otherwise modify those changes into higher-level, more coherent events which are then sent by the EVENT AGGREGATOR 561 to the FETCHER 580.

FSChange items sent by Cloud WATCHER 540 or EVENT AGGREGATOR 561 to the FETCHER 580 are received by the FETCHER 580 which then checks to see if any of the received changes are included in the BLACKLIST 570. The BLACKLIST 570 is a structure that lists those changes which have been previously sent to WORKERS 590 but were not completed for one reason or another. Accordingly, BLACKLIST 570 serves as a list of changes that are not to be performed so long as those changes remain on the BLACKLIST 570.

Conversely, changes received by the FETCHER 580 that are not included in the BLACKLIST 570 are sent by the FETCHER 550 to the WORKER(s) 590 as work items for subsequent processing. If a WORKER is unable to complete a work item, an ERROR 597 is declared and a record of the ERROR is added to the BLACKLIST 570. Conversely, when a WORKER completes a work item, any CHANGES that result are indicated in the SNAPSHOT 560 which, as we have already noted, maintains the current synchronization state between the SyncCLIENT 510 watched local FileSystem 515 and the Cloud FileSystem 520.

As may be generally appreciated by those skilled in the art, work items are generally those operations that are performed by the WORKERS to effect FSChanges. More particularly, a particular work item will generally identify an object to which it applies (i.e., a filename), a direction (i.e., download/upload), and an operation such as create, rename, delete, move and modify.

As depicted in this FIG. 5, the SNAPSHOT 560, is locked when any changes/updates are made to the SNAPSHOT 560 by WORKER(s) 590. Such locking ensures that the SNAPSHOT 560 does not change during updating and ensures coherence.

As shall be shown and described in more detail, FETCHER 550 generally serializes the flow of work items before subsequent parallel processing by WORKERS 590. In that regard and as we will describe in later detail later, FETCHER acts as a manager/lock that ensures that no two workers operate on conflicting and/or overlapping changes.

As may be appreciated by those skilled in the art, there exist a number of different operating systems on which exemplary SyncCLIENT 510 software may execute. Well known examples of such operating systems include, but not limited to, Microsoft WINDOWS, OS/X, and LINUX. As a result of the capabilities of such operating systems, WORKER(s) 590 may be implemented as multiple threads. Consequently, multiple WORKERS may operate simultaneously on multiple-processor or multiple-core computing systems or operate concurrently on uniprocessor computing systems. As a result, multiple WORKERS may be operating on a given work item concurrently with one another thereby enhancing the performance of sharing and synching operations.

Different operating systems such as those enumerated above provide different levels of detail with respect to changes that may occur within filesystems resident in such systems. For example, UNIX derivatives such as OS/X and LINUX provide folder level change notifications while Microsoft WINDOWS provides a more detailed, file level change notification. More specifically, OS/X provides information about changes made to folders, while Microsoft WINDOWS provides information about changes made to individual folders. Consequently at least two different Local WATCHER(s) are depicted in FIG. 5, namely Local WATCHER (Type-2) 530 and Local WATCHER (Type-1) 531. As further depicted in FIG. 5, Local WATCHER (Type-2) provides Folder-Level Change Notifications 531 while Local WATCHER (Type-1) 535 provides File-Level Change Notifications 536.

More particularly, Microsoft WINDOWS provides a ReadDirectoryChangesW Application Programming Interface (API) that provides notice of, for example, CHANGE_FILE_NAME—Any file name change in the watched folder (directory) or subtree; CHANGE_DIR_NAME—Any directoryname change in the watched directory or subtree; CHANGE_ATTRIBUTES—Any attribute change in the watched directory; CHANGE_SIZE—Any file-size change in the watched directory or subtree when file is written; CHANGE_LAST_ACCESS—Any change to the last access time of file(s) in the watched directory or subtree; CHANGE_CREATION—Any change to the creation time of files in the watched directory or subtree; and CHANGE_SECURITY—Any security-descriptor change in the watched directory or subtree; to SyncCLIENT software accessing that API.

Since OS/X does not provide this File-Level change notification, a local graph 532 is used by Local WATCHER (Type-2) 530 to track the state of the watched local FileSystem 515. Similarly, and according to an aspect of the present disclosure, the Cloud WATCHER 540 uses a cloud graph 541 to track the state of the watched Cloud Filesystem 520.

Finally, we note at this point that while FIG. 5 depicts both a Local WATCHER (Type-2) 530 and Local WATCHER (Type-1) 535 as component parts of SyncCLIENT 510, a particular instantiation of a SyncCLIENT advantageously does not require both.

Figure 5A:
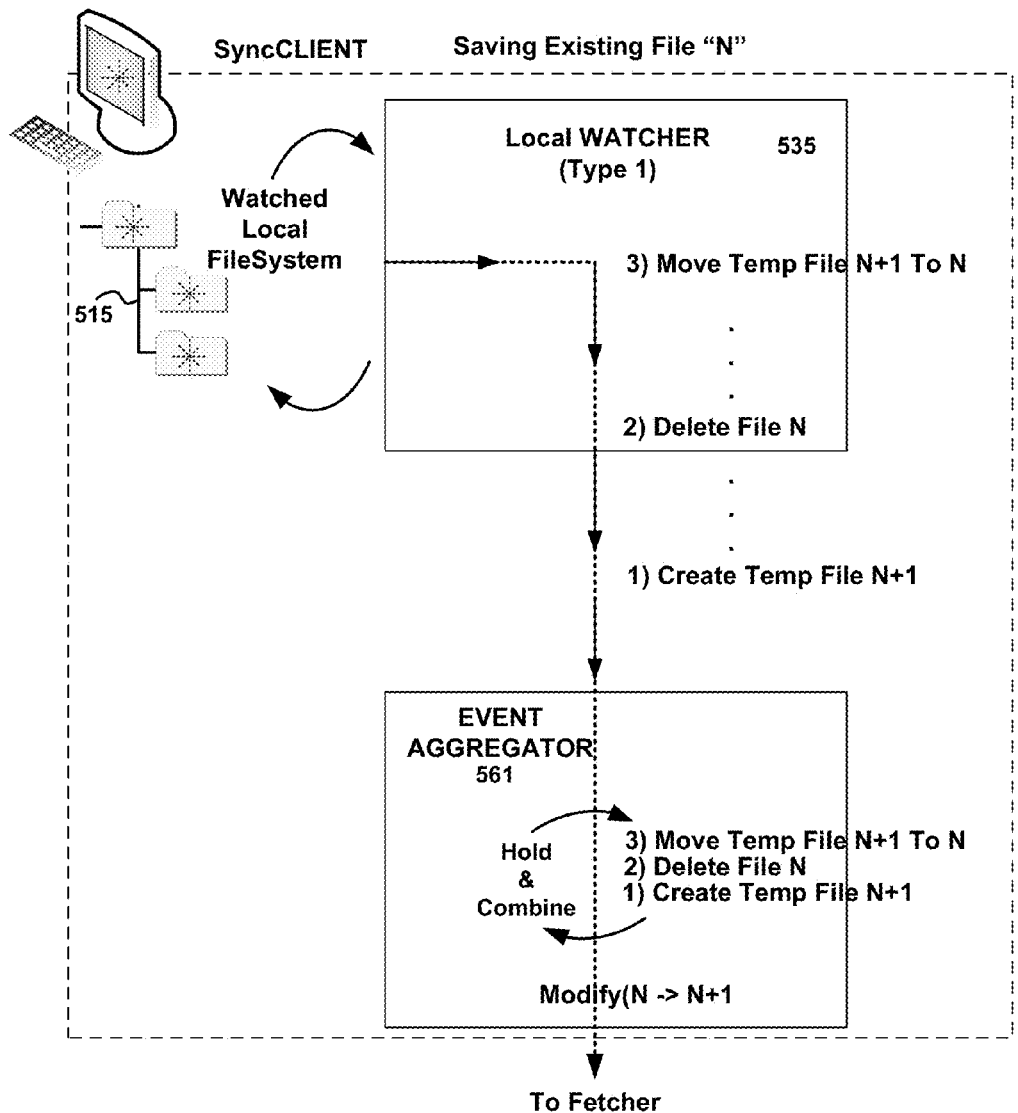
FIG. 5a is a schematic block diagram depicting an exemplary overview operation of EVENT AGGREGATOR according to an aspect of the present disclosure.

With reference now to FIG. 5a, there is shown a schematic block diagram depicting a sequence of events associated with the saving of an electronically stored file, "N", and the operation of the Local WATCHER 535 and the EVENT AGGREGATOR 561. As those skilled in the art will recognize, such a sequence may accompany the operation of any of a number of popular application programs or suites of programs.

More particularly, the general sequence of events associated with these popular application programs or suites of programs, while saving an electronically stored file, "N" is to:
1) Create a Temporary File "N+1";
2) Delete File "N";
3) Move Temporary File "N+1" to "N".

Accordingly, during SyncCLIENT operation the watched local file system 515 will exhibit the above sequence of events which will be detected by the Local WATCHER 535. If this sequence were to be forwarded by the Local WATCHER 535 to the FETCHER (not specifically shown), then a number of unnecessary steps would be performed which would possibly negatively affect performance of the system. To preserve performance and avoid unnecessary/redundant steps and according to another aspect of the present disclosure, an exemplary SyncCLIENT includes an EVENT AGGREGATOR 561.

As noted previously, the EVENT AGGREGATOR 561 generally will receive change notifications from the Local WATCHER and "hold" onto those notifications for some period of time. If during the hold period multiple changes are made to any related item(s) the EVENT AGGREGATOR 561 will advantageously combine or otherwise modify those changes into higher-level, more coherent events which are then sent by the EVENT AGGREGATOR 561 to the FETCHER.

With continued reference to FIG. 5a, the EVENT AGGREGATOR 561 is depicted as receiving the above sequence of events namely, 1) Create Temp File N+1; 2) Delete File N; and 3) Move Temp File N+1 to N. As depicted in FIG. 5a, the EVENT AGGREGATOR 561 holds and aggregates/combines that sequence into a single work item namely:

"Modify (N->N+1)";
which is subsequently forwarded to FETCHER for processing.

Figure 5B:
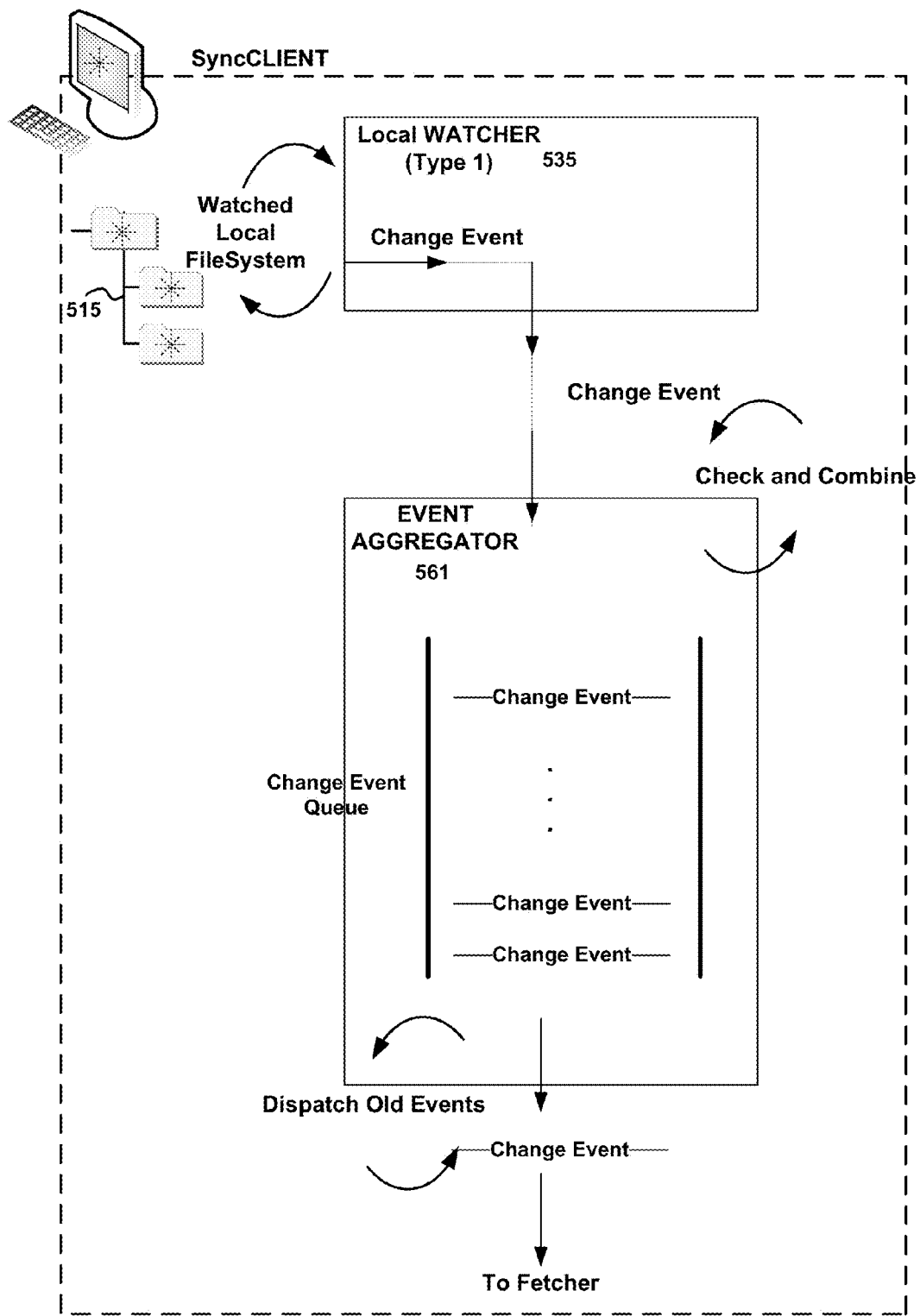
FIG. 5b is a schematic block diagram depicting an exemplary operation of EVENT AGGREGATOR according to an aspect of the present disclosure.

FIG. 5b is a schematic diagram depicting an overview of EVENT AGGREGATOR 561 processing according to an aspect of the present disclosure. As depicted in that FIG. 5b Change Events that are detected in the Watched Local FileSystem 515 by the Local WATCHER 535 are sent to EVENT AGGREGATOR 561 where they are placed into a Change Event Queue.

Prior to their insertion into the Change Event Queue, a received Change Event is checked to see whether or not it may be combined with a Change Event already in the Change Event Queue. If so, the received Change Event is combined with the Change Event in the Change Event Queue and the combined Change Event is reinserted into the Change Event Queue. If the received Change Event cannot be combined with a Change Event already in the Change Event Queue, then the received Change Event is inserted into the Change Event Queue, uncombined.

Periodically, the Change Event Queue is examined and any Change Event that has been in the Change Event Queue for a predetermined period of time is dispatched to the FETCHER (not specifically shown) for processing.

Figure 5C:
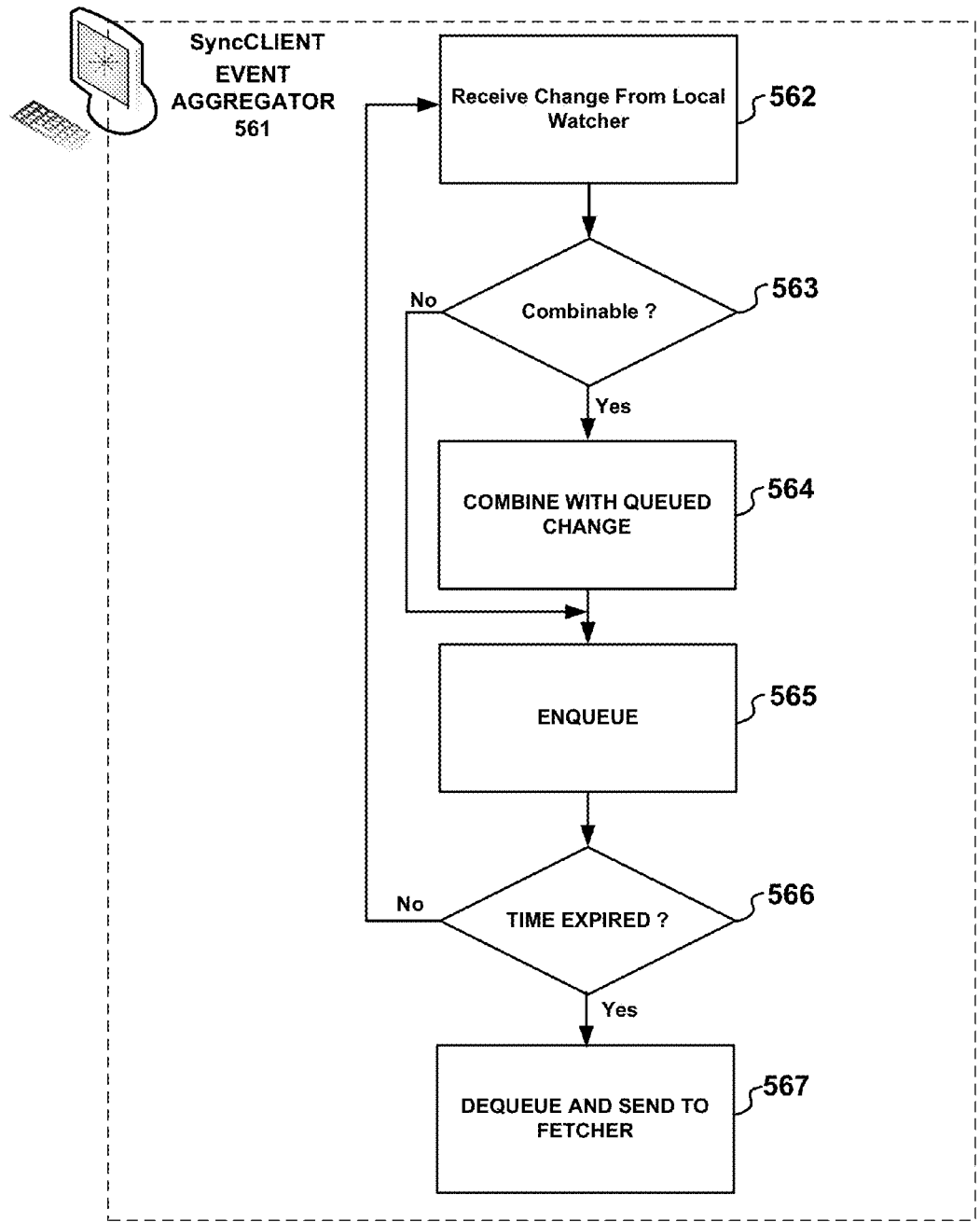
FIG. 5c is a flow diagram depicting an exemplary operational overview of the EVENT AGGREGATOR according to an aspect of the present disclosure.

FIG. 5c is a flow diagram depicting a general operational overview of the EVENT AGGREGATOR 561 according to an aspect of the present disclosure. With reference to that FIG. 5c, it is noted that at block 562 the EVENT AGGREGATOR 561 receives a change event from a Local WATCHER. Upon receipt of the change event, at block 563, the EVENT AGGREGATOR will examine the received change event to determine whether it is combinable with another received change event already inserted into a Change Event Queue.

If the received change event is combinable with a change event already in the Change Event Queue, it is combined with the queued change event at block 564 and the combined change event is enqueued in the Change Event Queue at block 565.

If the received change event is not combinable with a queued change event at block 564, then the received change event is enqueued into the Change Event Queue at block 565, uncombined.

Periodically, at block 566, the Change Event Queue is examined to determine whether any queued change events have been in the Change Event Queue for a period of time greater than some predetermined period. If so, then that change event is dequeued and sent to the fetcher for processing at block 567.

Notably, and according to another aspect of the present disclosure, the EVENT AGGREGATOR 561 may combine received events with events already in the Event Queue based on known/learned patterns that are recognizable. More particularly, the EVENT AGGREGATOR may recognize particular event combinations from known patterns of received change sequences, observed file types, detected executable programs, executing processes etc., and from these data determine the particular changes being observed and use this information to make combinations.

Figure 6:
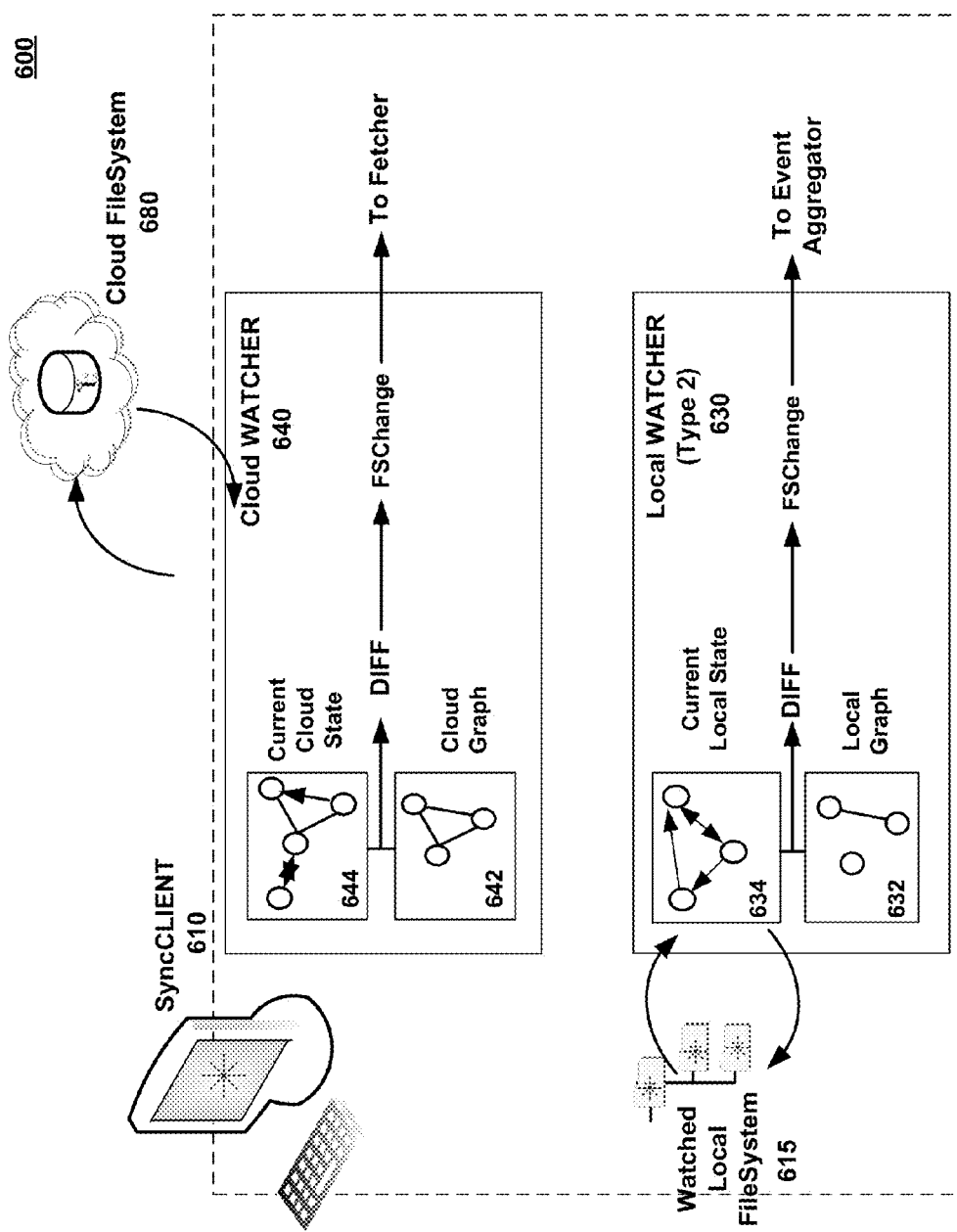
FIG. 6 is a schematic block diagram depicting Cloud WATCHER and Local WATCHER (Type-2) detecting changes to Cloud FileSystem and Local FileSystem respectively through the use of graphs according to an aspect of the present disclosure.

Turning now to FIG. 6, there is shown a schematic block diagram depicting the operation of a Cloud WATCHER 640 and Local WATCHER (Type-2) 630 on a representative SyncCLIENT 610 according to an aspect of the present disclosure. As depicted in FIG. 6, Cloud WATCHER 640 generates a Cloud Graph 642 which is indicative of the current state of the watched Cloud FileSystem 680. After generating the Cloud Graph 642, the Cloud WATCHER 640 periodically generates a Current Cloud State representation 644 and then determines any differences between the two. Upon detecting a difference between the Cloud Graph 642 and the Current Cloud State representation 644, the Cloud WATCHER 640 generates an FSChange (File System Change Notification) and sends that FSChange to the FETCHER (not specifically shown). As previously noted with respect to the discussion of FIG. 5, the FSChange notifications are used by the FETCHER to generate Work Items to be sent to WORKERS (not specifically shown).

In a preferred embodiment, the Current Cloud State representation 644 may be represented by an ordered list of changes made to objects within Cloud FileSystem as reported to the SyncCLIENT. The Cloud Graph 642 may be preferably represented as a dictionary structure that includes a ResourceID key wherein dictionary entries include—in addition to the ResourceID—any filename(s), checksum(s), and timestamp(s).

Similarly, Local WATCHER (Type-2) 630 monitors Watched Local FileSystem 615 via—for example—and FSEvents API which provides folder-level change notifications. Upon receipt of any folder-level change notifications, Local WATCHER (Type-2) 630 generates a Current Local State representation 634 which is indicative of the current state of the Watched Local FileSystem 615. The Local WATCHER (Type-2) 630 compares the Current Local State representation 634 with a previously generated, Local Graph 632 and determines any differences between the two. Upon detecting a difference between the Current Local State representation 634 and the Local Graph 632, the Local WATCHER 630 generates an FSChange and sends that FSChange to the EVENT AGGREGATOR (not specifically shown). As previously described with respect to FIG. 5a and FIG. 5b, The EVENT AGGREGATOR holds onto changes for a period of time and if multiple changes to related items or particular known patterns are detected, then the EVENT AGGREGATOR may combine or otherwise modify those received FSChange events into higher level, coherent events which are then sent to the FETCHER as Work Items to be performed.

Figure 6A:
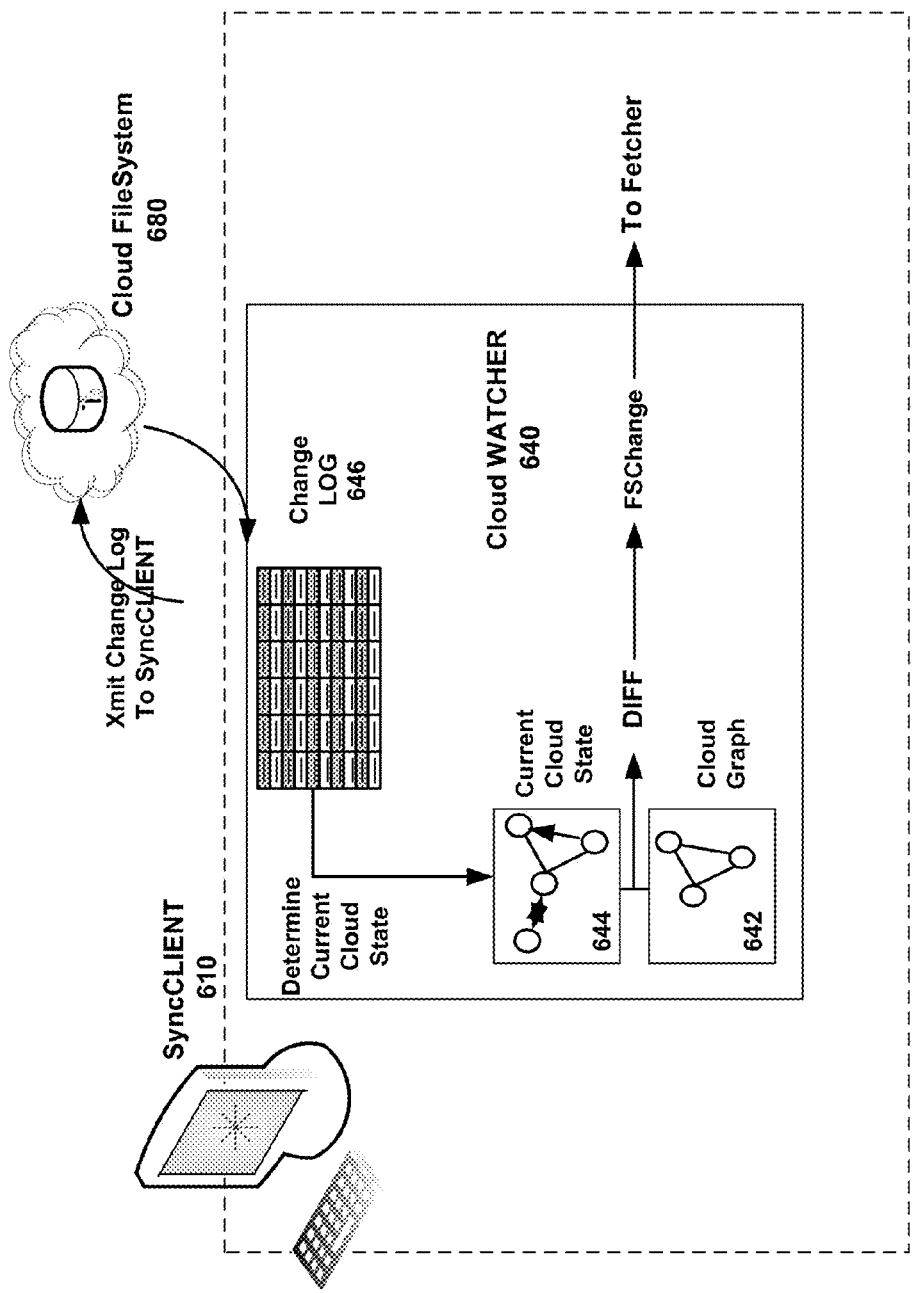
FIG. 6a is a schematic block diagram depicting Cloud WATCHER determining a current Cloud state from a Change LOG received from Cloud by SyncCLIENT according to an aspect of the present disclosure.

FIG. 6a is a schematic block diagram depicting the receipt and update of the current cloud state 644. As depicted in that FIG. 6a, the current cloud state 644 may be determined from a Change LOG 646 which is received by the SyncCLIENT 610 from the Cloud. In an exemplary embodiment, a Change LOG 646 such as that depicted in FIG. 6a includes an ordered list of changes made to the Cloud File System 680 that is relevant to the particular SyncCLIENT 610 and/or a particular account.

Advantageously, and according to an aspect of the present disclosure, the ordered list of changes made to the Cloud File System 680 included in the Change LOG 646 is already aggregated upon receipt by the SyncCLIENT 610. Consequently, the ordered list of changes received from the Cloud File System via the Change LOG 646 does not require further aggregation as do the changes observed by the Local WATCHERs described previously.

In a particular exemplary embodiment, the Change LOG 646 includes, for a particular account, a number of entries including an indication of the current state of an item; whether an item has been moved to trash; and whether an item has been deleted from the trash. Note that this exemplary listing of entries included in the Change LOG is meant to be representative, and not exhaustive. Consequently, additional entries indicative of an item's status may be provided via the Change LOG. As may be appreciated by those skilled in the art, these entries in the Change LOG may be used by the Cloud WATCHER to generate FSChange events that will be forwarded to the FETCHER.

Turning now to FIG. 7, there is shown a schematic block diagram depicting the generation of Work Items and subsequent processing of those Work Items by representative SyncCLIENT 710 according to an aspect of the present disclosure. As depicted therein and previously described, one or more FSChange events are sent from Cloud WATCHER 740 or EVENT AGGREGATOR 735 to the FETCHER 720 as Work Items where they are placed into an ordered Work Queue 726.

More particularly, upon receipt of Work Items 725, FETCHER 720 arranges the received Work Items 725 such that they are performed in a prescribed order. More specifically, Work Items 725[1] . . . 725[n] are entered into a Work Queue 726 ordered from Oldest to Newest. In this regard, the FETCHER 720, through the effect of the Work Queue 726, serializes the Work Items 725[1] . . . 725[n] before distributing those Work Items to Workers 750[1] . . . 750[n] for concurrent processing.

At this point we note again that while we have described the processing of Work Items by WORKERS 750[1] . . . 750[n] as being performed concurrently, in a multiple-processor or multiple-core (multiprocessor or multicore) processing arrangement that is possible in contemporary computing systems, the actual processing of multiple Work Items by multiple WORKERS 750[1] . . . 750[n] may advantageously proceed in parallel wherein each Worker thread may be executed by an individual processor or core. Accordingly, significant sharing and synchronization throughput is achieved by this multiple WORKER arrangement when operated concurrently or in parallel. Similar performance benefits are advantageously realized as a result of the Cloud WATCHER 740 and Local WATCHER 730 operating concurrently or in parallel, depending upon the particular computing system hardware and system software employed by SyncCLIENT 710.

With reference now to FIG. 8, there is shown a schematic block diagram 800 depicting the serialization of Work Items 825[1] . . . 825[n] by FETCHER 820. As depicted therein, incoming Work Items 825[1] . . . 825[n] are arranged in a Work Queue 826 in Oldest to Newest order.

Operationally, FETCHER 820 examines each of the Work Items in Work Queue 826 and determines whether it is processable (or not) by WORKERS 850[1] . . . 850[n]. In this exemplary embodiment depicted in FIG. 8, the FETCHER 820 sequentially examines Work Items 825[1] . . . 825[n] in the Work Queue 826, starting at the oldest and proceeding to the newest, to determine what dependencies—if any—are exhibited by the particular Work Item under examination. If an examined Work Item 825[1] . . . 825[n] in the Work Queue 826 is affected by any entries in the Dependency Map 890, then it is determined to be unprocessable at that time.

As depicted in FIG. 8, the Dependency Map 890 includes a list of structures that may be affected by operations being performed by any of the plurality of workers 850[1] . . . 850[n] at a given time. Dependency Map 890 entries of particular significance depicted in FIG. 8 are: inodes 891, resource ID(s) 892, and Filenames, etc., 893. Additional dependencies not specifically shown in FIG. 8 include Filenames of parents, children and cousin objects.

Those skilled in the art will readily recall that an inode is a data structure used by contemporary operating systems to store information about a file(s), directory(ies), or other file system object(s). Inodes store information about files and directories (folders) such as ownership, mode, and type. Files are associated with a particular inode, which is identified by an integer number (inode number).

Similarly, a resourceID is an identifier that uniquely identifies Cloud objects, for example, files. Accordingly, such a resourceID would uniquely identify a particular file stored within the Cloud filesystem.

Finally, filenames are generally metadata about a file. Frequently filenames are strings used to identify (preferably—uniquely) the file electronically stored in a filesystem. Oftentimes, filenames include additional components namely a path associated with the file, a name associated with the file, a type associated with the file, and a version associated with the file.

Advantageously, and according to an aspect of the present disclosure, the FETCHER 820 maintains the Dependancy Map 890 which identifies dependencies that are currently impacted by Work Items being acted on by any of the Workers 850[1] . . . 850[n]. Accordingly, as the FETCHER 820 examines Work Items 825[1] . . . 825[n] in the Work Queue 826 it compares dependencies affected by the Work Item being examined with any dependencies in the Dependency Map 890. If any such dependencies affected by the examined Work Item are in Dependency Map 890, then that Work Item is skipped and the FETCHER 820 examines the next Work Item in the Work Queue 826.

Notably, the ordering of Work Items 825[1] . . . 825[n] is preferably maintained even if a particular Work Item is skipped. Accordingly, the Work Queue 826 within FETCHER 820 will always be in Oldest to Newest Order.

If a particular Work Item is determined to be processable, that is to say its affected dependencies are not in the Dependency Map 890, then that Work Item is passed on to a WORKER 850[1] . . . 850[n] for processing.

Each time a Work Item is passed on to a WORKER for processing, any affected dependencies are indicated in the Dependency Map 890. Conversely, each time that a WORKER finishes with a Work Item it updates the Dependency Map 890 to indicate that it is no longer working on that particular set of dependencies.

Whenever a WORKER finishes with a particular Work Item, FETCHER 820 re-examines the Work Queue 820 starting from the Oldest Work Item 825[1] in the Work Queue 820, scanning to the Newest Work Item 825[n] in the Work Queue 826.

As those skilled in the art will readily appreciate, Work Items in Work Queue 826 that were previously skipped (due to dependency conflict for example) will be rescanned and processed if such a determination is made by FETCHER 820. Of further advantage, since FETCHER 820 ensures that no two Work Items sent to WORKERS have dependency conflicts, there is no need for locks and a high degree of concurrency and/or parallelism is achieved in the WORKER operations.

Figure 9:
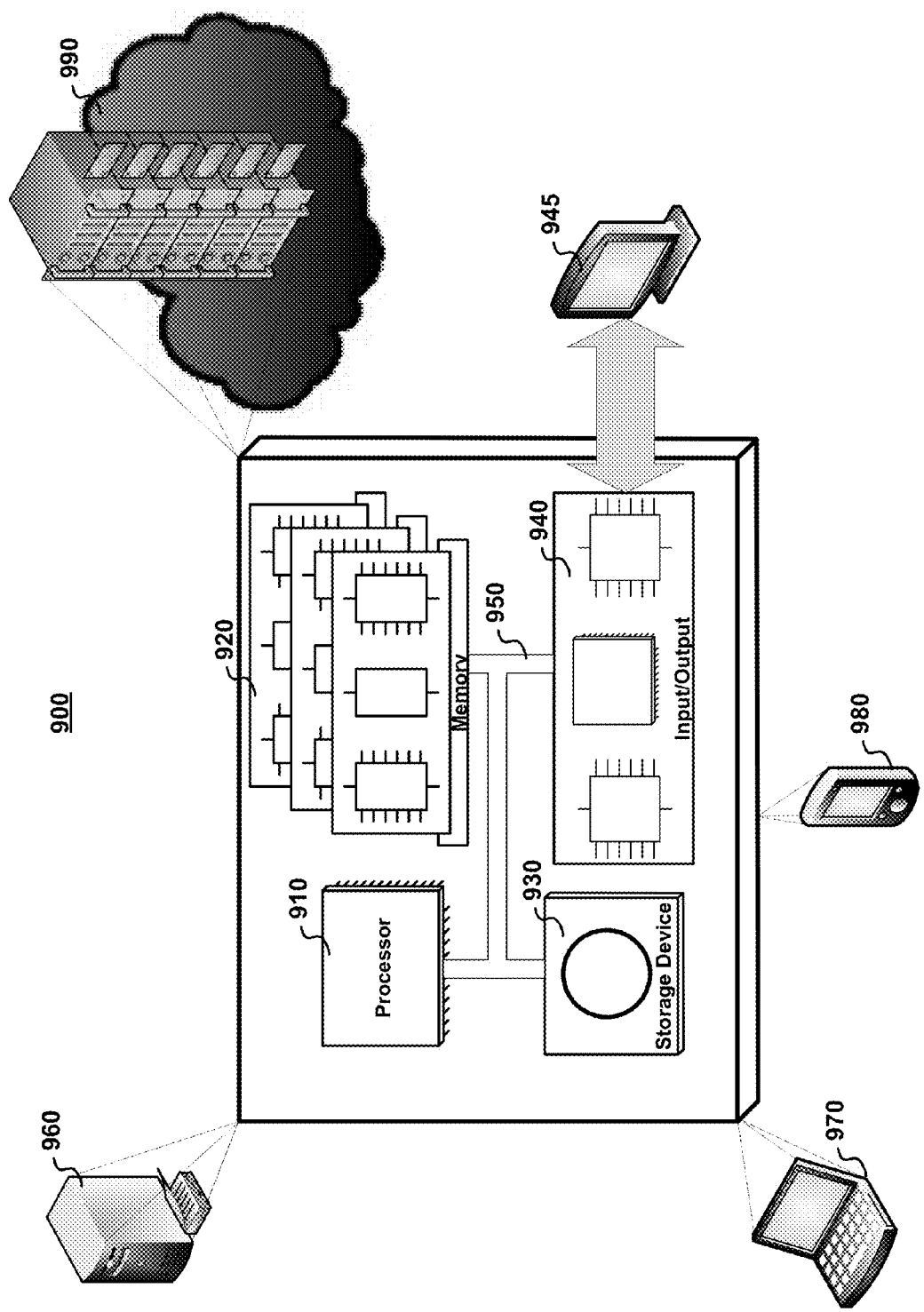
FIG. 9 is a schematic diagram depicting a representative computer system for implementing exemplary methods and systems for sharing and synchronizing electronically stored files according to an aspect of the present disclosure.

FIG. 9 shows an illustrative computer system 900 suitable for implementing methods and systems according to an aspect of the present disclosure. The computer system may comprise, for example a computer running any of a number of operating systems. The above-described methods of the present disclosure may be implemented on the computer system 900 as stored program control instructions.

Computer system 900 includes processor 910, memory 920, storage device 930, and input/output structure 940. One or more input/output devices may include a display 945. One or more busses 950 typically interconnect the components, 910, 920, 930, and 940. Processor 910 may be a single or multi core.

Processor 910 executes instructions in which embodiments of the present disclosure may comprise steps described in one or more of the Figures. Such instructions may be stored in memory 920 or storage device 930. Data and/or information may be received and output using one or more input/output devices.

Memory 920 may store data and may be a computer-readable medium, such as volatile or non-volatile memory. Storage device 930 may provide storage for system 900 including for example, the previously described methods. In various aspects, storage device 930 may be a flash memory device, a disk drive, an optical disk device, or a tape device employing magnetic, optical, or other recording technologies.

Input/output structures 940 may provide input/output operations for system 900. Input/output devices utilizing these structures may include, for example, keyboards, displays 945, pointing devices, and microphones—among others. As shown and may be readily appreciated by those skilled in the art, computer system 900 for use with the present disclosure may be implemented in a desktop computer package 960, a laptop computer 970, a hand-held computer, for example a tablet computer, personal digital assistant or Smartphone 980, or one or more server computers which may advantageously comprise a "cloud" computer 990.

At this point, while we have presented this disclosure using some specific examples, those skilled in the art will recognize that our teachings are not so limited. Accordingly, this disclosure should be only limited by the scope of the claims attached hereto.

The invention claimed is:

1. A computer implemented method for dispatching work items that effect sharing and synchronization of electronically stored files between a client file system and a cloud file system, the method comprising:
    ordering the work items in a queue from oldest to newest;
    sequentially examining from oldest to newest the queued work items;
    for a particular work item under examination:
        comparing a first set of dependencies with a second set of dependencies to determine whether there is at least one match between the first set of dependencies and the second set of dependencies, wherein:
            the first set of dependencies correspond to dependencies affected by the particular work item, and
            the second set of dependencies are in a dependency map and includes dependencies affected by a set of previously dispatched work items that are currently being processed by at least one worker thread;
        when there is no match,
            dispatching the particular work item to one of the at least one worker thread for processing, and updating the second set of dependencies to reflect the processing of the dispatched particular work item when the one of the at least one worker thread completes the processing; and when there is at least one match, proceeding to examine a next work item in the queue;

wherein a relative order of the work items in the queue that are not dispatched is maintained.

2. The computer implemented method of claim 1, wherein the entries in the dependency map include inodes of files undergoing synchronization, and wherein the files undergoing synchronization are affected by the operations being performed by the at least one worker thread.

3. The computer implemented method of claim 1, wherein the entries in the dependency map include resourceIDs of files undergoing synchronization and electronically stored in the cloud file system.

4. The computer implemented method of claim 1, wherein the entries in the dependency map include names of files undergoing synchronization.

5. The computer implemented method of claim 1, wherein the ordering, examining and dispatching of work items are performed concurrently with the processing of the set of previously dispatched work items by the at least one worker thread.

6. A computer implemented method of processing work items associated with sharing and synchronization of electronically stored files between a client file system and a cloud file system, the method comprising:

receiving a work item from a queue in which a plurality of work items including the work item are sequentially examined from oldest to newest;

comparing a first set of dependencies with a second set of dependencies to determine whether there is at least one match between the first set of dependencies and the second set of dependencies, wherein:

the first set of dependencies correspond to dependencies affected by the received work item, and the second set of dependencies are in a dependency map and includes dependencies affected by a previously dispatched work item that is currently being processed by at least one worker thread; and dispatching the received work item to one of the at least one worker thread if there is no match;

wherein the one of the at least one worker thread processes the dispatched received work item to cause the sharing and synchronization of an electronically stored file between the client file system and the cloud file system.

7. The computer implemented method of claim 6, further comprising enqueueing the received work item in the queue ordered from oldest to newest.

8. The computer implemented method of claim 7, further comprising updating the dependency map to reflect any operations associated with the dispatched received work item.

9. The computer implemented method of claim 8, wherein when the one of the at least one worker thread completes the processing of the dispatched received work item, the method further comprises updating the dependency map to reflect that the processing of the dispatched received work item is complete.

10. The computer implemented method of claim 9, wherein entries in the dependency map include inodes of electronically stored files undergoing synchronization, and wherein the files undergoing synchronization are affected by the operations being performed by the at least one worker thread.

11. The computer implemented method of claim 9, wherein entries in the dependency map include resourceIDs of files electronically stored in the cloud file system undergoing synchronization.

12. The computer implemented method of claim 9, wherein entries in the dependency map include names of electronically stored files undergoing synchronization.

13. A non-transitory computer storage medium having computer executable instructions which when executed by a computer cause the computer to perform operations comprising:

ordering the work items in a queue from oldest to newest;

sequentially examining from oldest to newest the queued work items;

for a particular work item under examination:

comparing a first set of dependencies with a second set of dependencies to determine whether there is at least one match between the first set of dependencies and the second set of dependencies, wherein:

the first set of dependencies correspond to dependencies affected by the particular work item, and the second set of dependencies are in a dependency map and includes dependencies affected by a set of previously dispatched work items that are currently being processed by at least one worker thread;

when there is no match, dispatching the particular work item to one of the at least one worker thread for processing; and when there is at least one match, proceeding to examine a next work item in the queue;

wherein a relative order of the work items in the queue that are not dispatched is maintained; and wherein the one of the at least one worker thread processes the dispatched work item to cause sharing and synchronization of an electronically stored file between a client file system and a cloud file system.

14. The non-transitory computer storage medium of claim 13, wherein the computer executable instructions further cause the computer to compare a current state of the Cloud file system to a graph to determine any changes to files in the Cloud file system.

15. The non-transitory computer storage medium of claim 13, wherein the computer executable instructions further cause the computer to update the second set of dependencies to reflect the processing of the dispatched particular work item when the one of the at least one worker thread completes the processing.

16. The non-transitory computer storage medium of claim 13, wherein the computer executable instructions further cause the computer to update the dependency map to reflect that the processing of the dispatched work item is complete when the one of the at least one worker thread completes the processing of the dispatched work item.

* * * * *